(12) United States Patent
Kojima et al.

(10) Patent No.: US 8,036,906 B2
(45) Date of Patent: Oct. 11, 2011

(54) METHOD AND SYSTEM FOR MERCHANDISE RETAIL MANAGEMENT AND PORTABLE TERMINAL

(75) Inventors: Akitoshi Kojima, Utsunomiya (JP); Yasuhiko Tsuda, Kashiba (JP)

(73) Assignees: Kojima Co., Ltd., Tochigi (JP); Sharp Kabushiki Kaisha, Osaka (JP)

( * ) Notice: Subject to any disclaimer, the term of this patent is extended or adjusted under 35 U.S.C. 154(b) by 2296 days.

(21) Appl. No.: 09/995,652

(22) Filed: Nov. 29, 2001

(65) Prior Publication Data

US 2002/0065680 A1    May 30, 2002

(30) Foreign Application Priority Data

Nov. 29, 2000   (JP) ................ P2000-362466

(51) Int. Cl.
     *G06Q 10/00*     (2006.01)
     *G06Q 20/00*     (2006.01)

(52) U.S. Cl. .......................... 705/1.1; 705/16

(58) Field of Classification Search ............ None
See application file for complete search history.

(56) References Cited

U.S. PATENT DOCUMENTS

| | | | | |
|---|---|---|---|---|
| 5,310,997 | A * | 5/1994 | Roach et al. | 235/375 |
| 5,595,264 | A * | 1/1997 | Trotta, Jr. | 186/56 |
| 5,804,807 | A * | 9/1998 | Murrah et al. | 235/383 |
| 5,984,182 | A * | 11/1999 | Murrah et al. | 235/383 |
| 6,189,781 | B1 * | 2/2001 | Yoshinaga et al. | 235/375 |
| 6,232,870 | B1 * | 5/2001 | Garber et al. | 340/10.1 |
| 6,607,125 | B1 * | 8/2003 | Clouser et al. | 235/383 |
| 6,625,580 | B1 * | 9/2003 | Tayama | 705/26 |
| 7,114,656 | B1 * | 10/2006 | Garver | 235/462.46 |

FOREIGN PATENT DOCUMENTS

| | | |
|---|---|---|
| JP | 10-124604 A | 5/1998 |
| JP | 10-162247 | 6/1998 |
| JP | 11-120438 A | 4/1999 |
| JP | 11-154277 A | 6/1999 |
| JP | 11-327964 A | 11/1999 |
| JP | 2000-30150 | 1/2000 |
| WO | WO 00/10144 | 2/2000 |

OTHER PUBLICATIONS

Whatis?com, RFID tagging, Retrieved Oct. 10, 2007, http://whatis.techtarget.com/definition/0,,sid9_gci1038008,00.html.*

* cited by examiner

*Primary Examiner* — Gerardo Araque, Jr.
(74) *Attorney, Agent, or Firm* — Birch, Stewart, Kolasch & Birch, LLP

(57) ABSTRACT

An object of the invention is to reduce necessary costs in a merchandise retail store, and to reduce customer inconvenience and waiting time. A customer entering a merchandise retail store borrows a RFID portable terminal at the store entrance. The customer selects a sample commodity from a store sales area, and a commodity code is read out from a wireless tag in a wireless tag label and stored with the RFID portable terminal, which simultaneously relays that information to the outside. An information-processing apparatus in the store receives this message, and prepares the commodity that the customer wishes to purchase. The customer returns the RFID portable terminal to the sales counter, settles payment, and receives his wrapped commodity.

16 Claims, 17 Drawing Sheets

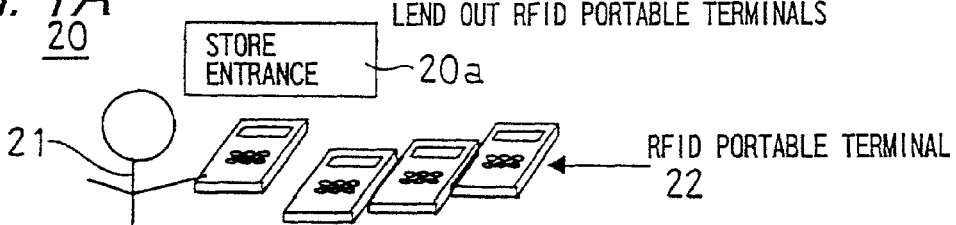
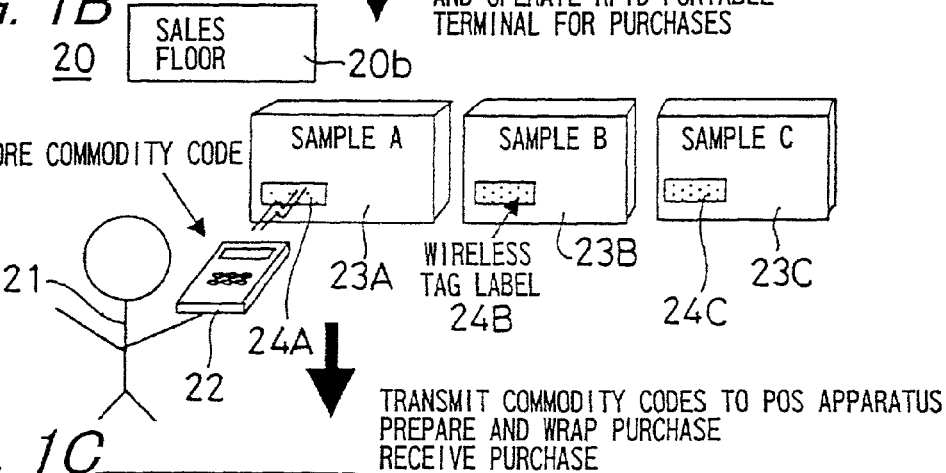
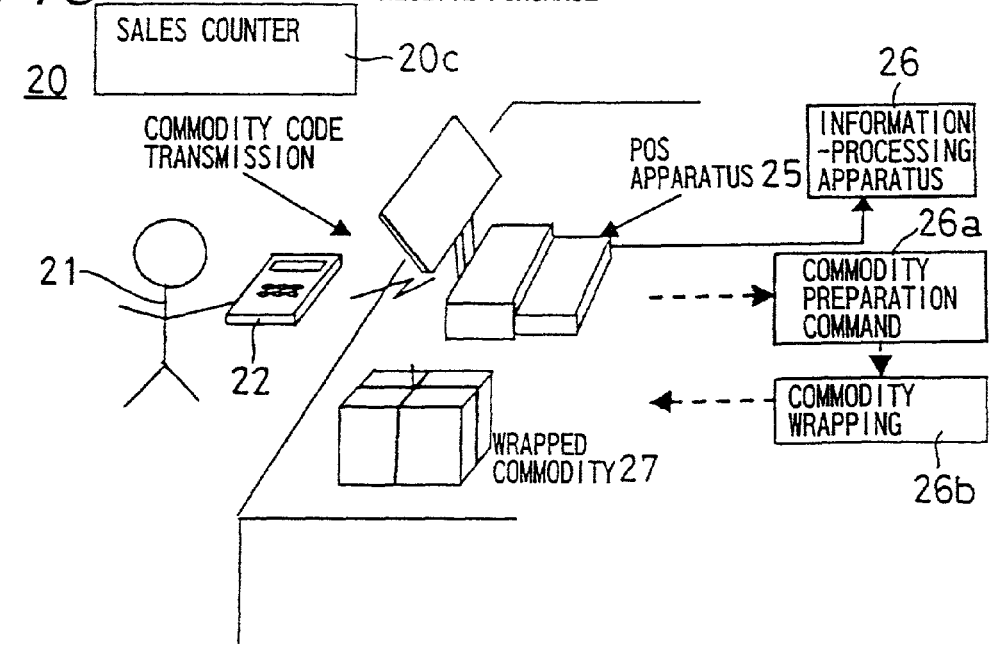

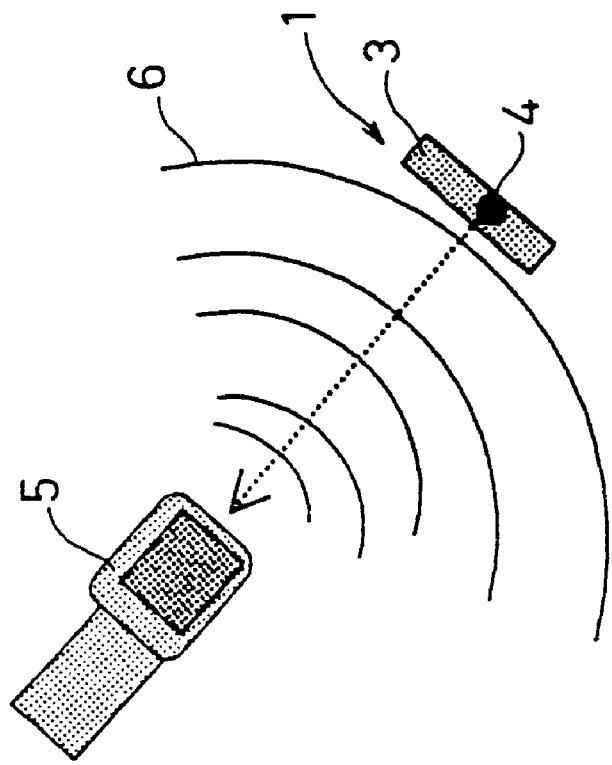
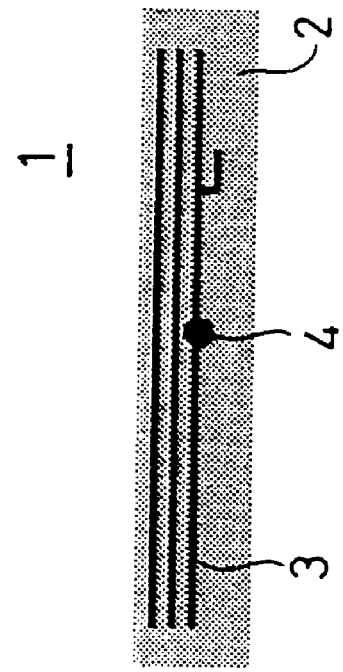

METHOD AND SYSTEM FOR MERCHANDISE RETAIL MANAGEMENT AND PORTABLE TERMINAL

BACKGROUND OF THE INVENTION

1. Field of the Invention

The present invention relates to a system and method for merchandise retail management, and a portable terminal for use in stores retailing commodities to customers and the like.

2. Description of the Related Art

In stores retailing commodities to customers, it is important that commodities purchased by customers can be sufficiently confirmed, and that when customers purchase a commodity, no waiting time is incurred at the time of settling payment or receiving commodities, for example. Additionally, anti-theft measures are also important.

As a general method for the selection of commodities by customers in the retail industry, like in a supermarket for example, customers directly choose commodities from a sales area and bring commodities to the cash register counter. However, when the commodities increase in size, the area necessary for the sales area increases, and customers are forced to bear the hassle of bringing commodities to the cash register counter. Consequently, a large-sized commodity is purchased in various manners. For example, desired commodities are directly pointed out to a store employee, and the store employee prepares the commodities; a paper slip which is attached to a sample display commodity of a desired commodity and is imprinted with the name and barcode thereof is brought to the cash register counter; and the method of selecting a commodity is selected from a catalog for the selection of commodities placed on the store counter.

FIG. 16A and FIG. 16B are views of a wireless tag 1 developed as a replacement for barcodes with technology for identifying articles such as commodities. As shown in FIG. 16A, the wireless tag 1 is formed by printing the conductor pattern of an antenna 3 on the surface of an insulating substrate 2, and further mounting an IC chip 4 on the insulating substrate 2 to serve as a semiconductor integrated circuit. The insulating substrate 2 has a size of about 60 mm×10 mm, for example.

As shown in FIG. 16B, an electromagnetic wave 6 is radiated from a reader 5, and if power is supplied to the antenna 3 of the wireless tag 1, a reflected wave of an intensity changed according to previously set data inside the IC chip 4 is radiated from the antenna 3. The reader 5 detects the reflected wave and can perform the contactless recognition of data.

FIG. 17 schematically shows the electrical configuration of the wireless tag 1 and the reader 5 shown in FIG. 16A and FIG. 16B. The wireless tag 1 includes a send/receive portion 7, a controller 8, and a memory 9 within the IC chip 4. The reader 5 includes an antenna 10, a send/receive portion 11 and a controller 12, and is also capable of data communication with a host computer 13. The memory 9 is a flash memory, for example, and can store the content of written data, the data having been written on it. The memory capacity of the memory 9 can easily be set to around 1024 bits (128 bytes), for example, and can display a large amount of information in comparison to regular one-dimensional barcodes only capable of displaying information of 13 digits in JAN code, for example. Additionally, contactless readout can be performed between the reader 5 and the wireless tag 1, and data can be read at a distance of around 30 cm to 1 m, for example. Data can be easily rewritten if a dedicated writer is used.

Japanese Unexamined Patent Publication JP-A 10-162247 (1998) discloses a purchased commodities registration system that uses wireless tags, and a purchased commodities payment settlement system using this registration apparatus. In this conventional technology, a wireless tag is attached to each commodity, and the commodity is organized on an open display shelf. A wireless tag reading apparatus is provided at the commodity takeout opening of the display shelf. A customer IC card is inserted into the wireless tag reading apparatus, and when a commodity is retrieved from the opening when the customer IC card is inserted in the wireless tag reading apparatus, the wireless tag reading apparatus detects this and information is registered onto the customer IC card. Because the customer brings the commodity and the IC card together to the sales counter, settling payment can be simplified.

Japanese Unexamined Patent Publication JP-A 2000-30150 (2000) discloses a related art technology wherein a wireless tag is attached to each commodity displayed in the sales floor for the purpose of prevention of theft as well as payment for commodities.

In the retail industry, when commodities are placed in a store and retailed, the retailer has numerous details to consider, including securing a space for placing commodities, managing inventory, methods of display, preventing damage and uncleanliness, preventing theft of the commodities, maintenance such as updating information and prices, and the distribution of appropriate store employees capable of explaining the commodities. Cost is also important.

Additionally, customers wanting to purchase a commodities are forced to endure troublesome inconveniences and waiting times, such as bringing commodities for purchase to the sales counter, making purchase requests to store employees for large commodities that is difficult to move, determining which store employees are knowledgeable of a particular commodity when desiring an explanation of that commodity, time spent waiting at the cash register counter when payment is being settled, and time spent designating goods to be delivered, designating the payment method, and waiting until wrapping is finished.

As in JP-A 10-162247 and JP-A 2000-30150, for example, by using wireless tags there is the possibility that a portion of the aforementioned problems can be solved. With these examples of conventional technology, however, the feature of each commodity being individually displayed and the customer bringing a selected commodity to a cash register counter is identical to the conventional format of supermarkets, for example, and improving the aspect of forcing the customer to carry the purchased commodity and wait for the wrapping is problematical. Moreover, a wireless tag must be attached to each commodity, and numerous reading apparatus must be provided, so the cost required by the store increases instead.

SUMMARY OF THE INVENTION

An object of the invention is to provide a merchandise retail management method, system, and portable terminal that can reduce the cost required by a store, and can also reduce customer inconvenience and waiting time.

The invention provides a merchandise retail management method comprising:

putting a tag on display together with a sample commodity in a display area, commodity information including an identification code of the commodity, being allowed to be read from and written to the tag;

lending out a portable terminal capable of reading the tag to a customer entering the display area;

reading the commodity information from the tag, which is put on display together with the corresponding sample commodity, with the portable terminal when the customer indicates an interest in purchasing the commodity;

storing the corresponding commodity information in the portable terminal and relaying it to an information-processing apparatus for merchandise management and sales management;

the customer returning the portable terminal when leaving; and handing over of the commodity to the customer after the information-processing apparatus has prepared the sold commodity in accordance with the relayed commodity information.

According to this aspect of the invention, a sample commodity is put on display in a display room together with a tag, and commodity information, including an identification code of the commodity, can be read from and written to the tag. Customers entering the display room are lent a portable terminal capable of reading the tags. When a customer indicates his intent to purchase the commodity, the portable terminal is used to read commodity information from of the tag that is on display together with the sample commodity in question. The commodity information that has been read is stored in the portable terminal, and is also relayed to an information-processing apparatus for merchandise management and retail management. Customers return the portable terminal when leaving, and the settlement of payment, for example, is carried out. Because the commodity information of the commodity to be purchased by the customer is relayed to the information-processing apparatus, the commodity can be prepared and wrapped before the customer finishes settling payment, and can be handed over without making the customer wait. Only one each of a plurality of commodities needs to be provided in the display area, so it is unnecessary for the store to increase the required display area, and a reduction in costs can be achieved. Customers need only carry the portable terminal borrowed from the retailer, and can pick up an ordered commodity after payment has been settled.

With this aspect of the invention, because a sample commodity is placed in the display room of a store and a tag that is capable of having the commodity information, including serial codes, read from and written to it is attached to each commodity, maintenance such as updating information and prices is simple, and the area of the display room can be reduced. It follows that if a commodity to be handed over to customers is not placed in the display room, customers will not take away the commodity from the display room, and shoplifting can easily be prevented. Customers inspect the sample commodity on display while carrying the portable terminal lent to them when entering the display area, and if they are interested in making a purchase, they can indicate that by reading out commodity information with the portable terminal. Commodity information read out by a customer is stored in the portable terminal and relayed to the information-processing apparatus, which performs merchandise management and retail management, and thus preparations can be undertaken for handing over the commodity purchased by customers. Customers return the portable terminals when exiting the display area, and can settle payments, for example, based on commodity information stored in the portable terminal. Because information on the commodity purchased by customers is relayed to the information-processing apparatus, the commodity can be prepared and wrapped before customers finish settling payments, for example, and the commodity can be handed over without making customers wait. Because only one each of a plurality of commodities needs to be placed in a display room, it is unnecessary to increase the display room space required by a store, and a reduction in costs can be achieved.

In the invention it is preferable that a wireless tag is used which commodity information is allowed to be read from and written to via radio waves, and the commodity information is relayed to the information-processing apparatus at the same time when the commodity information is read from the wireless tag.

According to this aspect of the invention, a wireless tag, which is capable of having commodity information read from and written to it via radio waves, is used as the tag displayed on a sample commodity, and thus contactless readout of a large amount of commodity information can be easily performed. Because commodity information from the wireless tag is relayed to the information-processing apparatus at the same time that it is read out with the portable terminal, it is possible to begin preparation of the ordered commodity early with the information-processing apparatus.

With this aspect of the invention, a wireless tag that is capable of having commodity information read from and written to it via radio waves, is used as the tag displayed on a sample commodity, and thus customers can perform the contactless readout of a large amount of commodity information. Because commodity information from the wireless tag is relayed to the information-processing apparatus at the same time that it is read out, it is possible to begin preparing the ordered commodity early with the information-processing apparatus, and it is possible to not make customers wait for a commodity to be handed over.

The invention provides a merchandise retail management system for aggregating commodity information of commodities that a customer indicates an intent to purchase from among sample commodities which are on display in a display room, and for preparing the commodities, comprising:

a wireless tag displayed on each sample commodity, wherein commodity information, including an identification code of that commodity can be read from and written to the wireless tag via radio waves;

a portable terminal that is held by customers that have entered the display room, and which is capable of reading the commodity information on the wireless tag, that stores commodity information that has been read out and relays the commodity information to the outside; and an information-processing apparatus for receiving the relay from the portable terminal and for preparing a commodity that a customer has indicated the intent to purchase.

According to this aspect of the invention, a wireless tag, onto which commodity information, including its identification code, is stored, is displayed on a sample commodity that is on display in a display area. If, regarding a commodity that a customer in the display area wishes to purchase, the commodity information stored on the wireless tag is read by radio waves with the portable terminal, the commodity information that has been read out is relayed to the outside, and thus the commodity can be prepared before the customer settles payment, and the commodity can be handed over to the customer immediately after payment has been settled without making the customer wait.

With this aspect the invention, a sample of the commodity is displayed in the display area, and a wireless tag, onto which the commodity information including the identification code is stored, is posted on the sample commodity. If, regarding a commodity that a customer in the display area wishes to purchase, the commodity information stored on the wireless tag is read by radio waves with the portable terminal, the commodity information that has been read out is relayed to the outside, and thus this message is received by the information-processing apparatus, the commodity can be prepared before the customer settles payment, and the commodity can be handed over immediately after payment has been settled without making the customer wait.

In the invention it is preferable that the merchandise retail management system further comprising a rewriting apparatus for rewriting the commodity information on the wireless tag.

According to this aspect of the invention, the commodity information on the wireless tags can be rewritten using the rewriting apparatus, so that wireless tags can be used on numerous commodities, and moreover commodity information can always be updated.

With this aspect of the invention, the commodity information on the wireless tags can be rewritten using the rewriting apparatus, so maintenance of commodity information is easy.

In the invention it is preferable that the portable terminal includes:

input means with which the customer commands an arithmetic process relating to stored commodity information; and arithmetic means for conducting arithmetic processing according to the command to the input means.

According to this aspect of the invention, if a customer commands the input means in the portable terminal to perform an arithmetic process relating to the commodity information, the arithmetic means performs the instructed arithmetic process, and thus the customer can easily determine the total amount of the bill of his purchased commodity, for example.

With this aspect of the invention, customers instruct the portable terminal to perform an arithmetic process relating to commodity information, and can easily determine the total amount of the bill of their purchased commodities, for example.

In the invention it is preferable that the portable terminal includes:

input means with which the customer designates stored commodity information; and display means for displaying commodity information in accordance with to the designation made to the input means.

According to this aspect of the invention, when the customer designates stored commodity information with the input means on the portable terminal, the display means displays commodity information in accordance with that designation, and the commodity thus purchased can be easily confirmed, for example.

With this aspect of the invention, customers can display commodity information on the portable terminal and easily confirm the purchased a commodity, for example.

In the invention it is preferable that the portable terminal relays commodity information to an outside at the same time that the portable terminal reads out the commodity information from the wireless tag.

According to this aspect of the invention, because commodity information is relayed to the outside at the same time the customer reads out that commodity information with the portable terminal from a wireless tag, the retailer can learn of a customer's ordered commodity at an early time, and can easily prepare the commodity prior to the customer arriving at the payment settlement counter, for example the sales counter.

With this aspect of the invention, the retailer can learn of the commodity purchased by a customer at an early, namely at the same time that the customer reads out commodity information from a wireless tag with the portable terminal, and the commodity can be prepared in advance of the customer arriving at the payment settlement counter, for example the sales counter.

In the invention it is preferable that the information-processing apparatus includes:

wireless communication means for wireless communication with the portable terminal held by a customer checking out; and customer specification means for specifying customers by wireless communication via the wireless communication means.

According to this aspect of the invention, the information-processing apparatus wirelessly communicates, via the wireless communication means, with the portable terminal held by customers leaving from the sample commodity display area, and can specify customers with the customer specification means.

With this aspect of the invention, the information-processing apparatus can wirelessly communicate with the portable terminal held by customers leaving the sample commodity display area, and can specify customers.

In the invention it is preferable that the information-processing apparatus further includes:

commodity information readout means for reading out the commodity information stored in the portable terminal through wireless communication with the portable terminal via the wireless communication means;

display means for displaying a list of commodity information that has been read out by the commodity information readout means;

correction input means for receiving corrected input from customers who have viewed the list displayed by the display means; and commodity correction means for correcting commodity information in accordance with the corrected input when the corrected input means receives corrected input.

According to this aspect of the invention, the information-processing apparatus wirelessly communicates with the portable terminal using the wireless communication means, reads out commodity information stored in the portable terminal with the commodity information readout means, displays the commodity information as a list with the display means, and if the customer inputs corrections into the correction input means, the commodity information is corrected by the commodity correction means, and the commodity thus purchased can be reviewed and mistakes can be prevented.

With this aspect of the invention, the information-processing apparatus wirelessly communicates with the portable terminal and reads out commodity information stored in the portable terminal, displays the commodity information as a list, and the purchased commodity can be reviewed and mistakes can be prevented.

In the invention it is preferable that the information-processing apparatus carries out revision and addition of information to the list through wireless communication with the portable terminal via the wireless communication means.

According to this aspect of the invention, the information-processing apparatus wirelessly communicates with the portable terminal via the wireless communication means and revises and adds information to the list of commodity information displayed by the display means, and thus can provide an opportunity for the customer to review their purchased commodities.

With this aspect of the invention, the information-processing apparatus wirelessly communicates with the portable terminal and performs the revision and the addition of information to the list of displayed commodity information, so it is possible to provide customers with the opportunity to review their purchased commodities.

In the invention it is preferable that the information-processing apparatus is further provided with payment processing means capable of processing payment for sales, displayed by the display means.

According to this aspect of the invention, the information-processing apparatus displays a list of commodity information with the display means and processes payment for sales, so the processing of payments for settling the payment of a their purchased commodities that is to be purchased can be quickly carried out such that customers are not made to wait.

With this aspect of the invention, the information-processing apparatus displays a list of commodity information and also processes payment for sales, so the process of settling payment can be carried out quickly so that the customer is not made to wait.

The invention provides a portable terminal comprising:

tag reading means for reading via radio waves commodity information written onto a wireless tag;

storing means for accumulating and storing commodity information that has been read by the tag reading means;

wireless communication means for relaying commodity information to the outside via radio waves at the same time that the commodity information is stored in the storing means; and display means for displaying the commodity information that has been read out.

According to this aspect of the invention, a portable terminal includes tag reading means, storing means, wireless communication means, and display means. The tag reading means reads commodity information, which has been written on wireless tags, with radio waves, and thus, if a wireless tag is presented on a sample commodity, the tag reading means can perform contactless readout of the commodity information of the corresponding commodity. The display means displays the commodity information that has been read out, so read out commodity information can be easily confirmed. The storing means accumulates and stores the commodity information read out by the tag reading means, and thus can store the fact that a customer indicates an interest in purchasing after viewing a plurality of sample commodities items placed on display in a display area, for example, in the portable terminal. The wireless communication means relays commodity information to the outside by radio waves at the same time that the commodity information is stored in the storing means, and thus also the merchandise retailer can learn of commodities to be purchased by a customer at an early time, and can prepare the actual commodity that is to be purchased.

With this aspect of the invention, because the portable terminal reads commodity information written onto wireless tags with the tag reading means using radio waves, if wireless tags are attached to a sample commodity, contactless readout of the commodity information for that commodity can be performed. Additionally, the portable terminal displays read out commodity information, and so it is easy to confirm the commodity information that has been read out. Results showing a customer's intention to make a purchase after viewing a plurality of commodity samples placed on display in a display room, for example, can be stored and stored in the portable terminal. Furthermore, the portable terminal relays commodity information to the outside by radio waves at the same time that the commodity information is stored, so that the merchandise retail store can learn of a customer's ordered commodity in advance, and can prepare the commodity that is to be purchased.

BRIEF DESCRIPTION OF THE DRAWINGS

Other and further objects, features, and advantages of the invention will be more explicit from the following detailed description taken with reference to the drawings wherein:

FIG. 1A, FIG. 1B, and FIG. 1C are diagrams showing a merchandise retail management method, merchandise retail management system, and portable terminal in an embodiment of the invention;

FIG. 16A and FIG. 16B are diagrams illustrating the basic configuration of a wireless tag and showing how information is read out from a wireless tag with a reader.

DETAILED DESCRIPTION OF THE PREFERRED EMBODIMENTS

Figure 2:
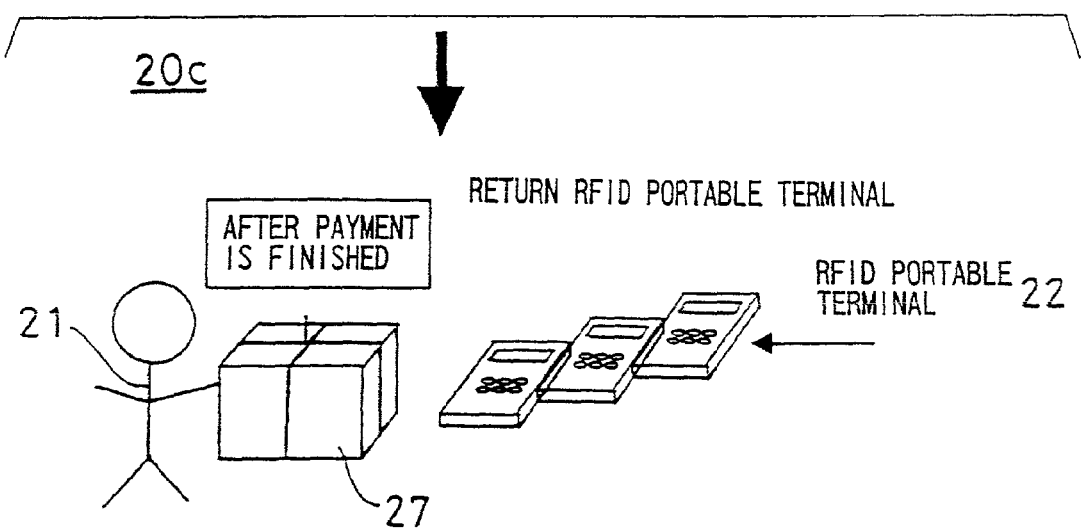
FIG. 2 is a diagram showing the RFID portable terminal 22 being returned after payment has been settled at the sales counter 20c in the embodiment of FIG. 1.

Now referring to the drawings, preferred embodiments of the invention are described below.

FIG. 1A, FIG. 1B, and FIG. 1C show an outline of a merchandise retail management method, a merchandise retail management system, and a portable terminal as an embodiment of the invention. The invention is executed when a customer 21 in a merchandise retail store 20 purchases a commodity. FIG. 1A shows the layout of a store entrance 20a, FIG. 1B shows the layout of a store sales area 20b, and FIG. 1C shows the layout of a sales counter 20c.

As shown in FIG. 1A, the customer 21 visiting the merchandise retail store 20 for shopping receives an RFID portable terminal 22 at the store entrance 20a. The merchandise retail store 20 lends out the RFID portable terminal 22 to the customer 21, and collects it from the customer 21 when the customer leaves. As shown in FIG. 1B, the customer 21 who has entered the merchandise retail store 20 moves toward the store sales area 20b, where a desired commodity is on display. In the store sales area 20b, the commodity sold by the merchandise retail store 20 is itself not on display but rather a sample of each commodity is displayed as a sample commodity 23A, 23B, 23C, and so forth. Wireless tag labels 24A, 24B, 24C, etc. are each respectively attached to the sample commodity 23A, 23B, 23C, etc. The wireless tag labels 24A, 24B, 24C, etc. incorporate wireless tags, and are written with commodity information, including identifying information, that can be read out with radio waves. Wireless tags are called "RFID" because their serial information can be read with high-frequency radio waves, and the portable terminal with the function of reading those wireless tags is called the RFID portable terminal 22. The RFID portable terminal 22 can read commodity information written onto the wireless tags from the wireless tag labels 24A, 24B, 24C, etc. attached to the sample commodity 23A, 23B, 23C, etc.

The customer 21 in the store sales area 20b directs the RFID portable terminal 22 toward the wireless tag labels 24A, 24B, 24C, etc. attached to the sample commodity 23A, 23B, 23C, etc., respectively, of the commodity that he wishes to purchase, and presses an order button 32A, which is described later. With this operation the RFID portable terminal 22 reads commodity information, including the commodity code for identifying the commodity, from the wireless tag in the commodity wireless tag labels 24A, 24B, 24C, etc., and the commodity code, for example, is stored in the RFID portable terminal 22. The customer 21 repeats the procedure for purchasing a commodity using the above-described method on each desired commodity. At the same time that commodity information is read out, it can be relayed to a component outside the RFID portable terminal 22 via radio waves.

Figure 3:
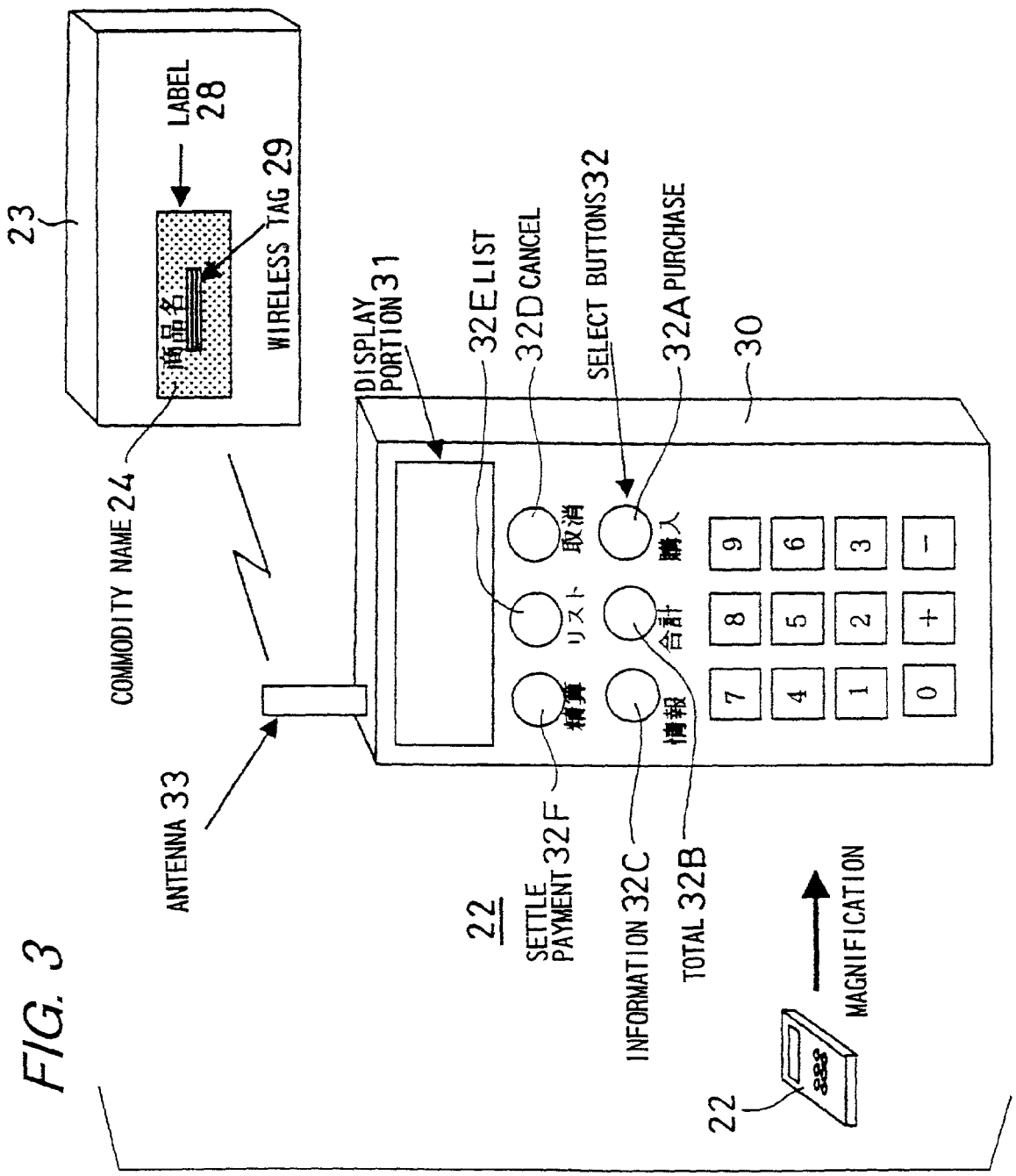
FIG. 3 is a diagram showing how, in the embodiment of FIG. 1, the wireless tag 29 attached to the sample commodity 23 is read using the RFID portable terminal 22.

After all shopping has been completed, as shown in FIG. 1C, the customer 21 heads toward the sales counter 20c, directs the RFID portable terminal 22 toward a POS apparatus 25 provided there, and presses a settle payment button 32F (depicted in FIG. 3). With the settle payment button, the RFID portable terminal 22 communicates with the POS apparatus 25 via radio waves. With this wireless communication, the commodity codes of the all of the commodities selected by the customer 21 and stored in the RFID portable terminal 22 are transmitted to the POS apparatus 25. The POS apparatus 25 functions as a single terminal connected to an information-processing apparatus 26 for conducting merchandise management and sales management in the merchandise retail store 20. The information-processing apparatus 26 receives commodity information relayed to the outside by the RFID portable terminal 22 concurrently with the RFID portable terminal 22 reading out that commodity information from a wireless tag. When the information-processing apparatus 26 receives this information, it executes a commodity preparation command 26a based on the commodity code included in the relay. The merchandise retail store 20 carries out preparations in accordance with the commodity preparation command 26a by taking out a commodity from a store warehouse, for example.

At the sales counter 20c, commodity information sent from the RFID portable terminal 22 to the POS apparatus 25 is also entered into the information-processing apparatus 26. The information-processing apparatus 26 compares the entered commodity code with the commodity code obtained from the previously received information relay, and if there is a new commodity code, the information-processing apparatus 26 executes the commodity preparation command 26a for the corresponding commodity. Furthermore, the information-processing apparatus 26, based on all of the commodity codes selected by the customer 21, looks up the price data and calculates the total price of purchased commodities, and executes a command to perform the retrieval of an actual commodity from a store stockroom, for example. Based on this command, the commodity is brought to the sales counter 20c from a store stockroom, for example, and after the customer 21 confirms the commodity, tasks such as commodity wrapping 26b are begun. The customer 21 receives a wrapped commodity 27.

The customer 21 selects a commodity itself in the store sales area 20b and does not have to bring a commodity to the sales counter 20c, so the burden on the customer 21 can be reduced. The merchandise retail store 20 need not provide numerous actual commodities in the store sales area 20b and can use the store sales area 20b as a display floor for the sample commodity 23A, 23B, 23C, etc., so a small floor area can be effectively utilized, and sales costs required in displaying commodities can be reduced. If the store sales area 20b is limited to a display area for the sample commodity 23A, 23B, 23C, etc., it also becomes easy to monitor the store for the shoplifting of commodities, for example.

Additionally, the commodity preparation command 26a and the commodity wrapping 26b can be performed early each time the information-processing apparatus 26 receives a message from the RFID portable terminal 22. Preparations for the wrapped commodity 27 can be completed before the customer 21 finishes the selection of commodity and arrives at the sales counter 20c, and it becomes possible to keep the customer 21 from waiting at the sales counter 20c. The merchandise retail store 20 can attend to the customer 21 without increasing the number of sales registers 20c, so sales costs can be lowered.

FIG. 2 shows the customer 21, after tasks at the sales counter 20c of FIG. 1C have been completed, returning the RFID portable terminal 22 to the merchandise retail store 20 and receiving the wrapped commodity 27. When the task of commodity wrapping 26b is complete and payment settlement with the POS apparatus 25 has been completed, a signal that payment settlement has been completed is sent from the POS apparatus 25 to the RFID portable terminal 22. The customer 21 settles payment at the sales counter 20c, and returns the RFID portable terminal 22 to the merchandise retail store 20 and receives their wrapped commodities.

Figure 14A:
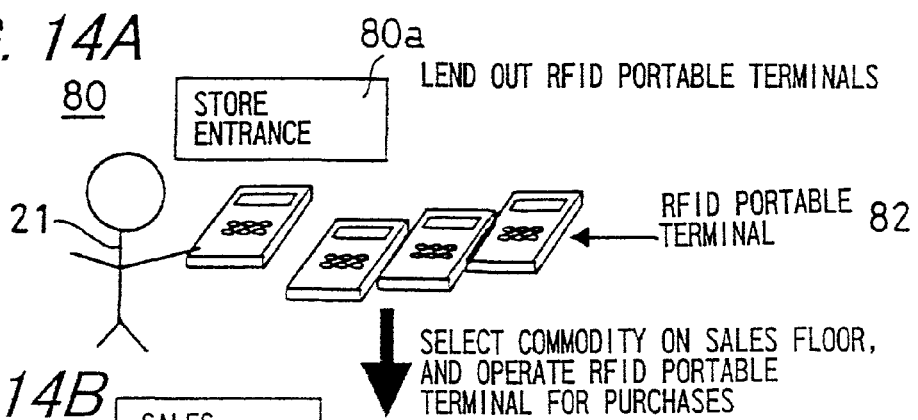
FIG. 14A, FIG. 14B, and FIG. 14C are diagrams of a merchandise retail management method and a merchandise retail management system according to another embodiment of the invention.
Figure 14B:
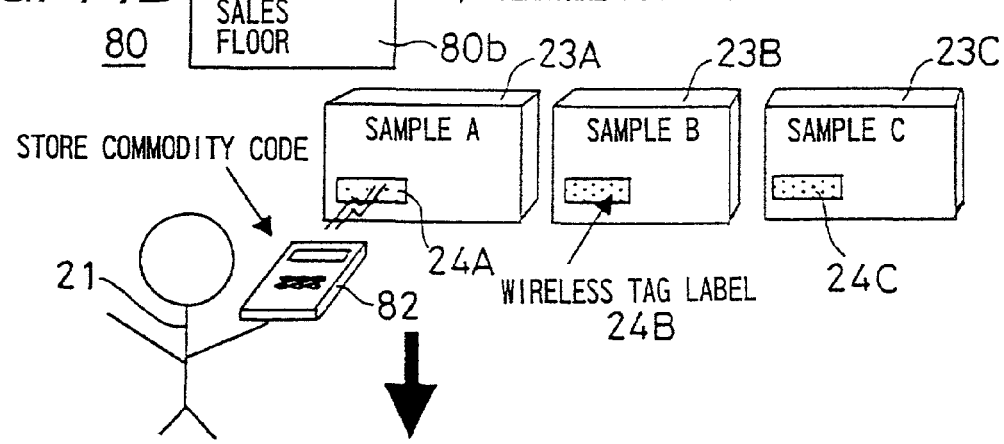
Figure 14C:
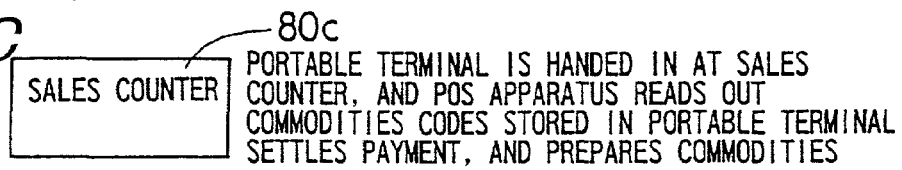

FIG. 3 shows how commodity information such as the commodity code is read out from a wireless tag by the RFID portable terminal 22. The sample commodity 23A, 23B, 23C, etc. and the wireless tag labels 24A, 24B, 24C, etc. shown in FIG. 1B are referred to generically with reference numerals "23" and "24", respectively. The wireless tag labels 24 attached to a sample commodity 23 on display in the store sales area 20b in FIG. 1B are sheet-shaped labels 28 made of paper or plastic, onto which a wireless tag 29 is attached. The name of the commodity, for example, is printed on the labels 28. As is illustrated in FIG. 14A to FIG. 14C and in FIG. 15, the wireless tags 29 can be stored with a larger amount of commodity information than can be printed on the labels 28.

The RFID portable terminal 22 has a portable-type casing 30 provided with a display portion 31, select buttons 32, and an antenna 33, among others. The select buttons 32 include the above-mentioned order button 32A, a total button 32B, and a commodity information button 32C. The select buttons 32 further include a cancel button 32D, a list display button 32E and a settle payment button 32F. If the customer 21 brings the antenna 33 close, for example around 30 cm to 1 m, to the sample commodity 23 corresponding to the commodity that he wants to purchase and presses the order button 32A, the customer 21 can read out commodity information from the wireless tag 29 via radio waves of a high frequency of around several GHz, for example, and concurrently relay the commodity information to the outside.

Figure 4:
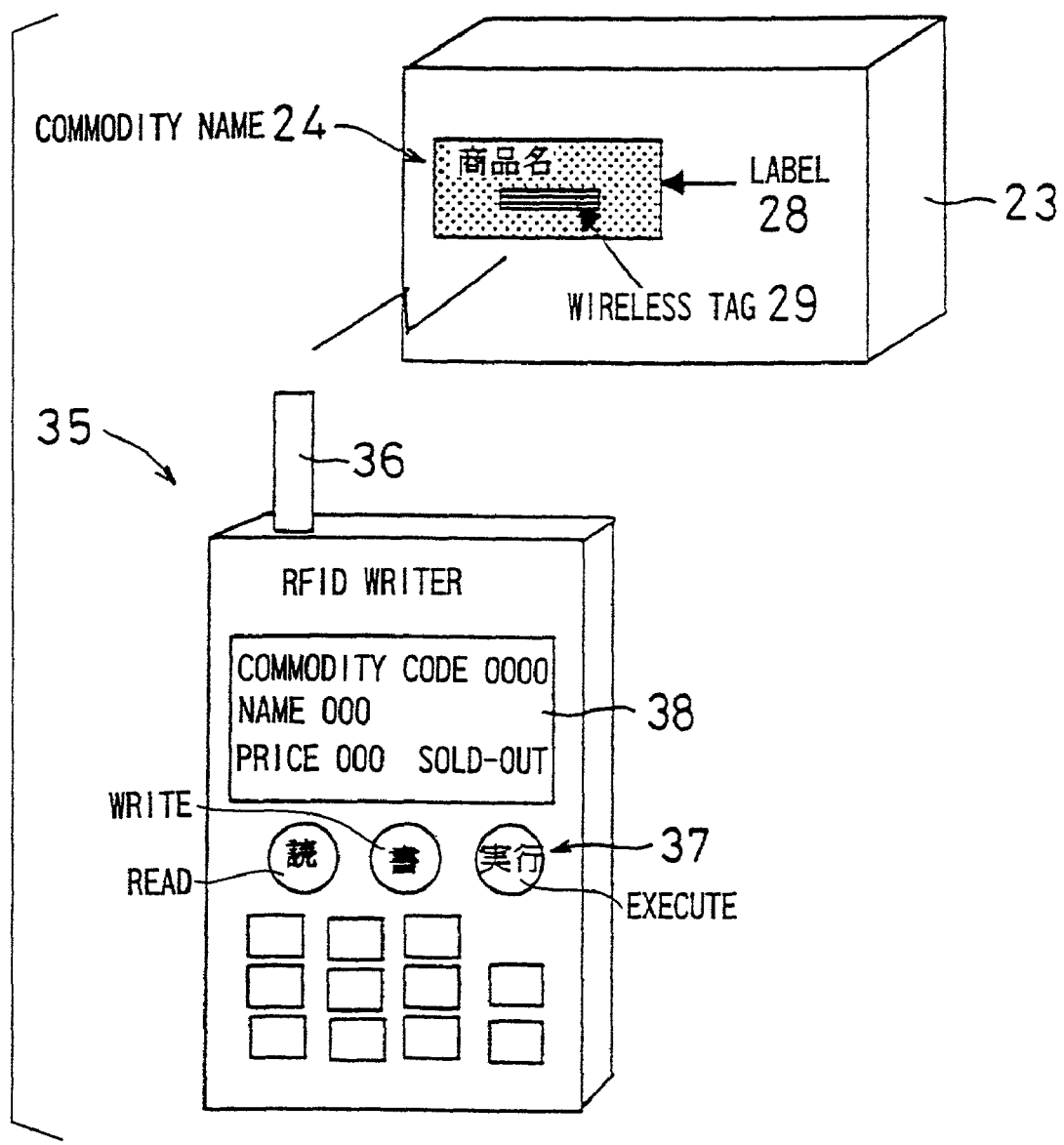
FIG. 4 is a diagram showing how, in the embodiment of FIG. 1, the wireless tag 29 attached to the sample commodity 23 is written over with the writing apparatus 35.

FIG. 4 shows an outline of a writing apparatus 35 capable of writing commodity information, for example, onto the wireless tag 29 shown in FIG. 3. The writing apparatus 35 transmits radio waves of a high frequency, such as those described above, from an antenna 36 to the wireless tag 29, and can write onto the memory component inside an IC chip. The writing apparatus 35 is provided with a select button 37 and a display portion 38. The select button 37 selects whether to operate the writing apparatus 35 for writing or to operate it for reading, and control buttons for executing the respective selected operation are provided. The display portion 38 can display commodity information to be transmitted to and written on the wireless tag 29, and can display commodity information read out from the wireless tag 29 to verify the commodity information after it has been written.

In the merchandise retail store 20 shown in FIG. 1A through FIG. 1C, commodity information, for example, can be freely written onto the wireless tag labels 24 attached to the sample commodity 23 on display in the store sales area 20b if the merchandise retail store 20 managing the writing apparatus 35 and the sales personnel using it when necessary. If apart from the commodity code the wireless tags 29 include price information, then the price information can be changed with the writing apparatus 35 when store prices are revised. Additionally, in the event that when payment has been settled for a commodity it is discovered that stock of that commodity item has run out, the information that the commodity has been sold out can be added to the wireless tag 29 of that commodity with the writing apparatus 35.

Writing to the wireless tag 29 is performed according to a specific writing sequence. If only the writing apparatus 35 is provided with the function of writing to the wireless tags 29 and the RFID portable terminal 22 is not provided with that function, it is possible to prevent a scenario wherein the customer 21 operates the RFID portable terminal 22 and rewrites the information stored on the wireless tags 29.

Figure 5A:
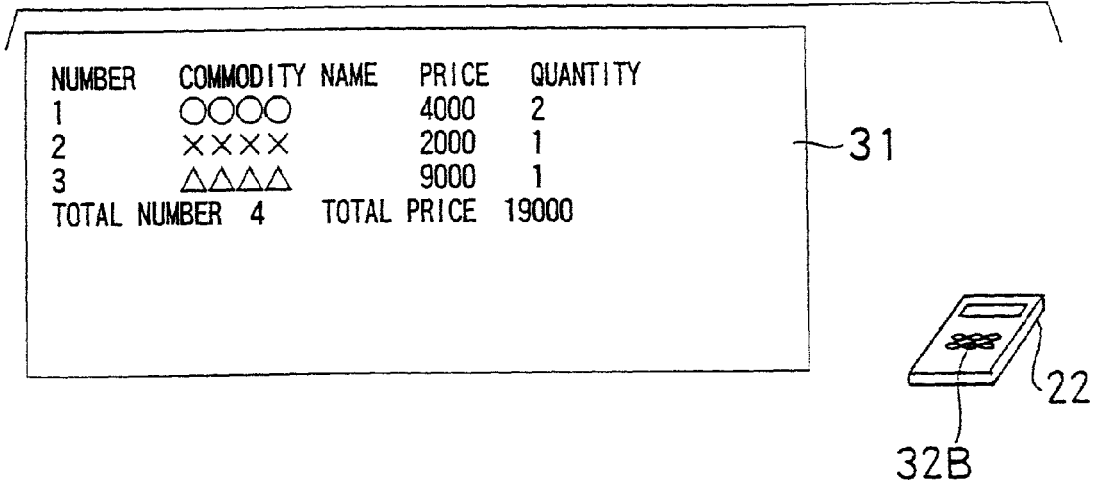
FIG. 5A and FIG. 5B are diagrams showing how, in the embodiment of FIG. 1, the total display and the information display are performed with the RFID portable terminal 22.
Figure 5B:
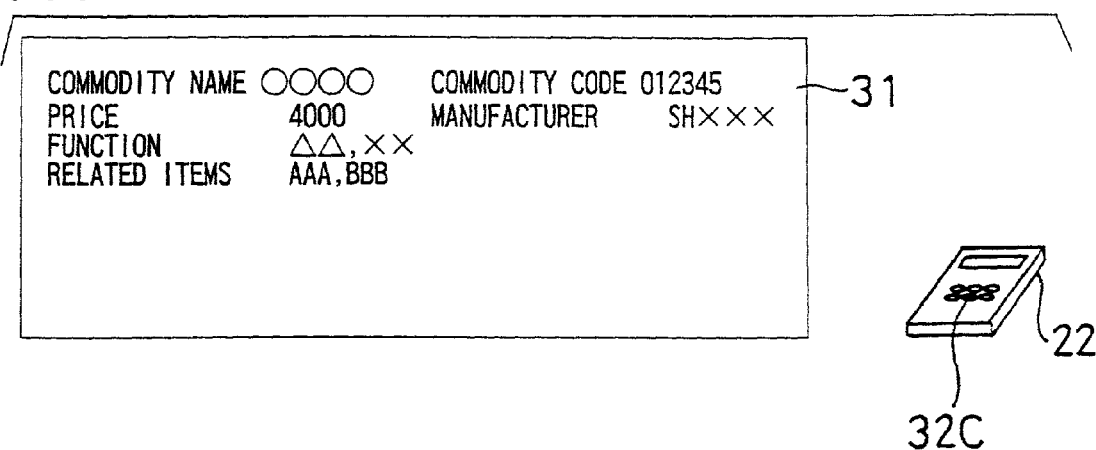

FIG. 5A and FIG. 5B show an example of the content displayed on the display portion 31 when the customer 21 points the RFID portable terminal 22 toward the wireless tag label 24 attached to the sample commodity 23 on display as a sample of commodity that he wishes to purchase, and pushes one of the select buttons 32. FIG. 5A shows an example of a total display up to the calculated results of the total amount, displayed by pressing the total button 32B after the order button 32A has been pressed to indicate a desire to make a purchase. In addition to being able to store the commodity code, name, and price in the RFID portable terminal 22 of a commodity that a customer has indicated a desire to purchase, the quantity and total price of the commodity purchased by the customer 21 up to that time can be calculated within the RFID portable terminal 22 and the results thereof can be displayed on the display portion 31 and referenced. FIG. 5B shows an example of the commodity information button 32C being pressed to bring up the information display that displays supplementary information on the function and properties of a commodity. Supplementary commodity information is read from the information-processing apparatus 26 or the wireless tag 29 via wireless communication, and is displayed with the display portion 31. Because the description of commodity can be displayed on the RFID portable terminal 22 as supplementary information, the customer 21 can use this information as a reference in making the decision to purchase a commodity. Additionally, the merchandise retail store 20 does not have to position store employees for the purpose of explaining commodities, and can provide the customer 21 with sufficient explanation and achieve a reduction in sales costs.

Figure 6:
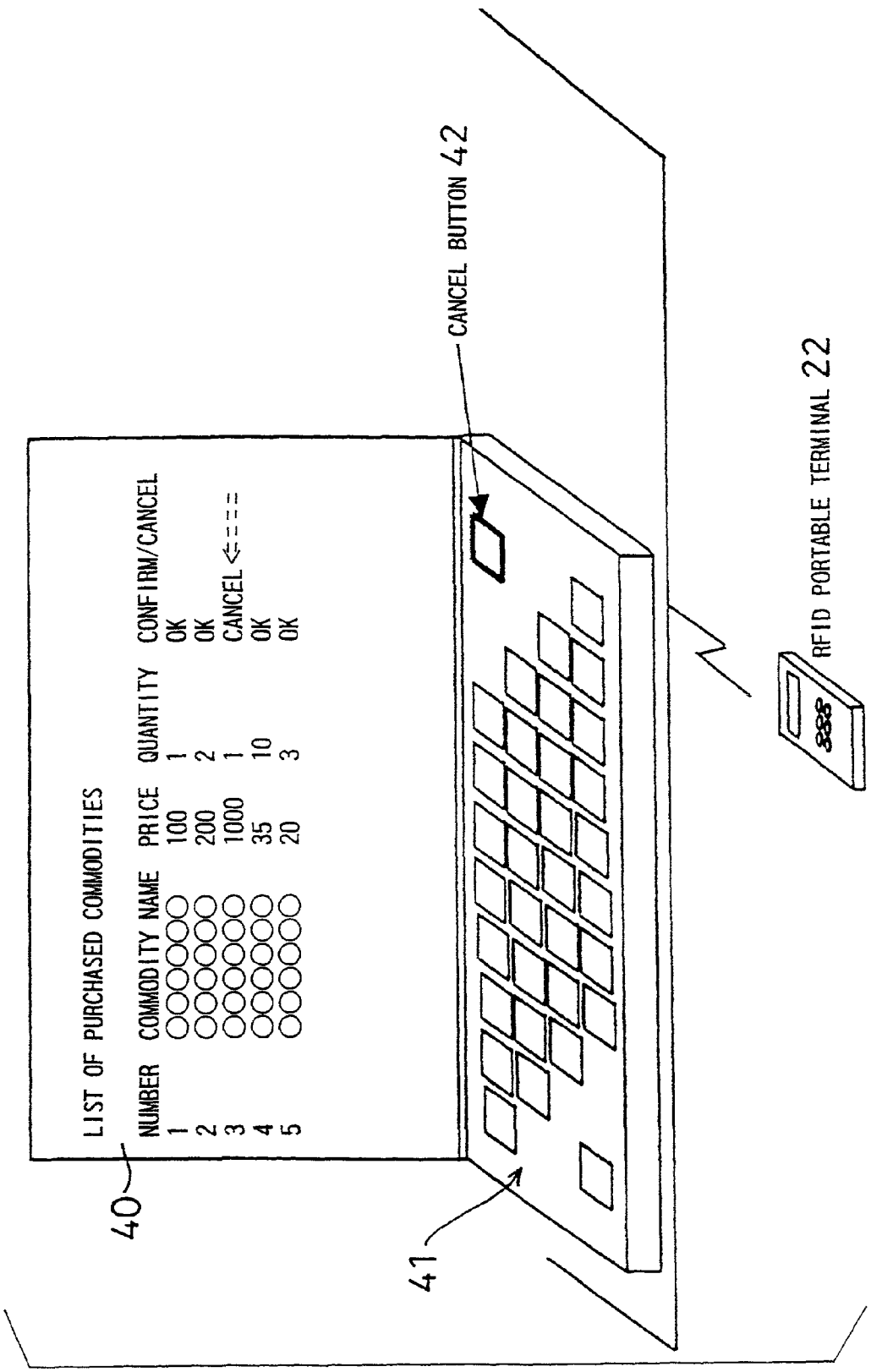
FIG. 6 is a diagram showing how, in the embodiment of FIG. 1, commodity information is displayed on the display screen 40 of the information-processing apparatus 26 connected to the RFID portable terminal 22 via wireless communication.

FIG. 6 shows how the information-processing apparatus 26 or a terminal thereof is used to display a shopping list of commodities on a display screen 40. The RFID portable terminal 22 and the information-processing apparatus 26 are connected via wireless communication, and when the list display button 32E is pressed, the RFID portable terminal 22 sends the list display command and commodity codes to the information-processing apparatus 26, and a shopping list of commodities based thereon is displayed. The customer 21 can view the displayed list and add a commodity for purchase from a keyboard 41, and can make revisions, such as canceling the purchased commodity, by pressing a cancel button 42 on the keyboard 41.

Figure 7:
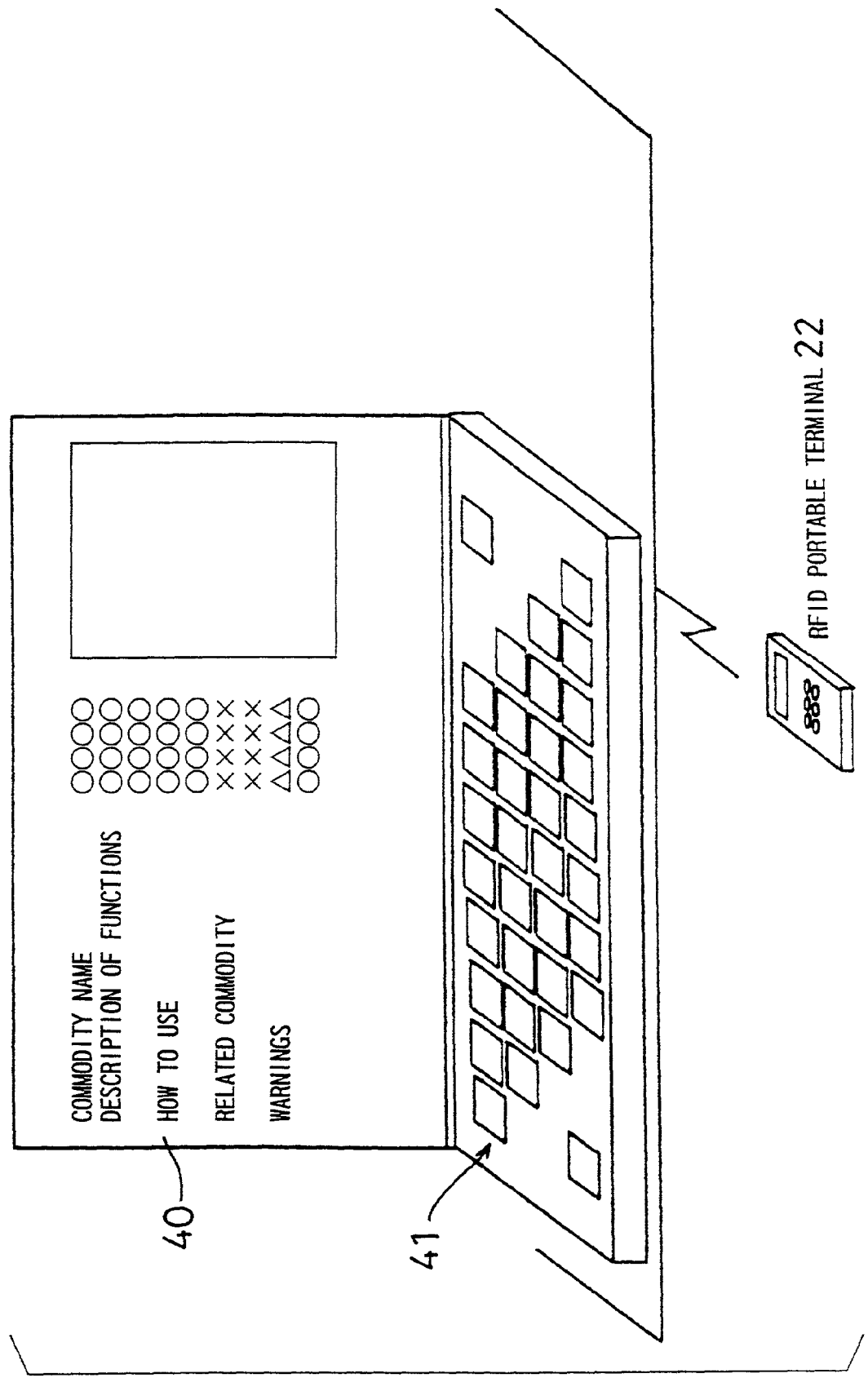
FIG. 7 is a diagram showing how, in the embodiment of FIG. 1, the display of commodity information and the confirmation and correction of purchases are performed on the display screen 40 of the information-processing apparatus 26 connected to the RFID portable terminal 22 via wireless communication.

FIG. 7 shows how the RFID portable terminal 22 and the information-processing apparatus 26 are connected via wireless communication. The information-processing apparatus 26 is provided with the display screen 40 and the keyboard 41, and forms a commodity information database for commodities and sales management. When commodity codes stored in the RFID portable terminal 22 are transmitted to the information-processing apparatus 26, detailed information on the functions, properties, methods of use, and related commodities, for example, of a commodity selected by the customer 21 is displayed on the display screen 40. It is preferable that a terminal of the information-processing apparatus 26 provided with the display screen 40 and the keyboard 41 is placed such that the customer 21 can use it, and that with the keyboard 41 the customer 21 is able to freely designate information to be displayed.

Figure 8:
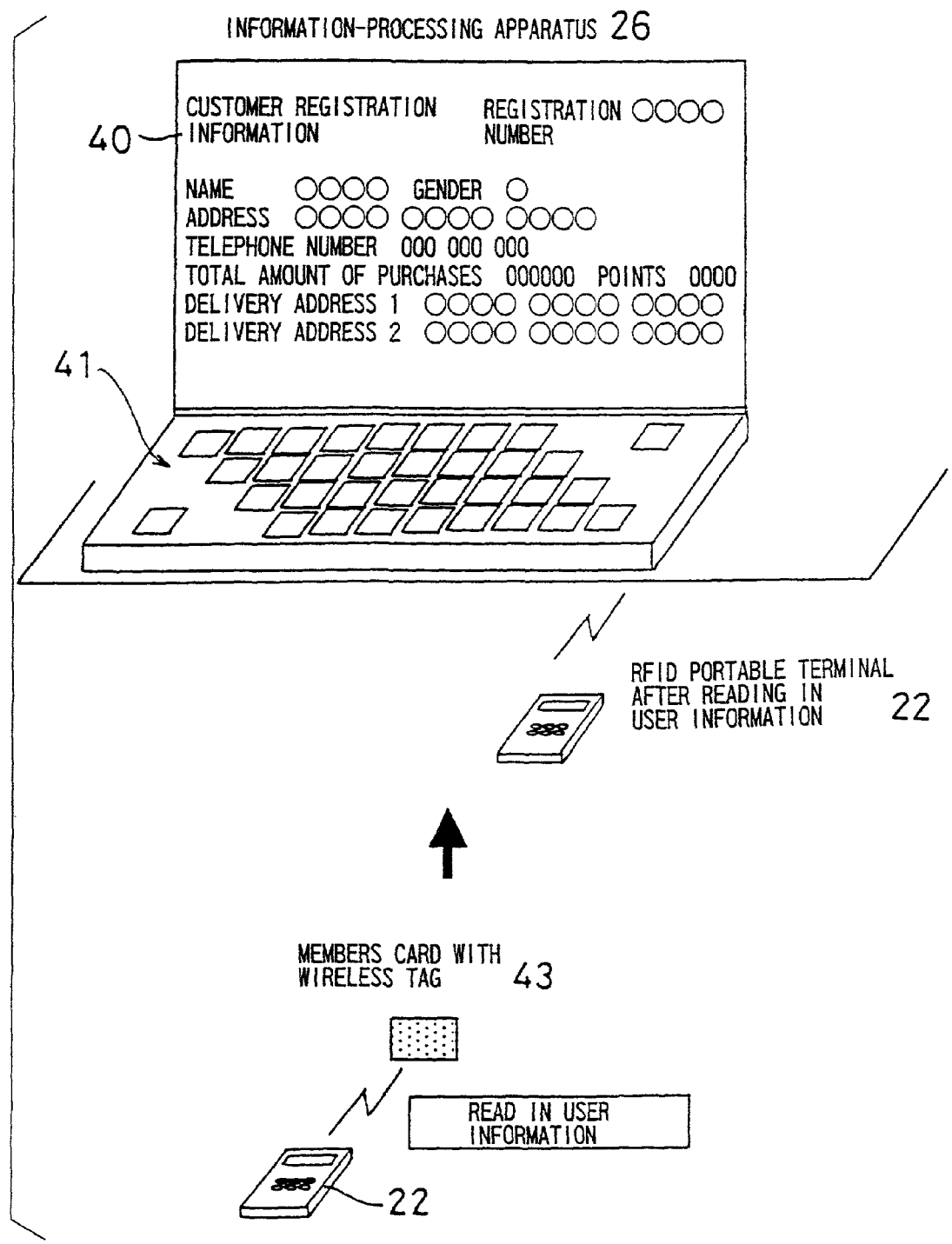
FIG. 8 is a diagram showing how, in the embodiment of FIG. 1, customers are distinguished with the RFID portable terminal 22, and customer information is displayed on the display screen 40 of the information-processing apparatus 26 connected thereto via wireless communication.

FIG. 8 shows the customer 21 being distinguished using the RFID portable terminal 22. The customer 21 is presumed to have a members card 43 containing a wireless tag on which user information is written. Certain information is registered on the members card 43 that is created when a customer first visits the merchandise retail store 20, and from the second time or thereafter that a customer visits the store, he generally uses the members card 43 first created for him. The information registered on the members cards is managed by the information-processing apparatus 26 as a customer database. The members card 43 itself is written with information that includes an ID number for identifying the customer 21 as a user. When the ID number is read from the members card 43 with the RFID portable terminal 22, that ID number is sent to the information-processing apparatus 26 or a terminal thereof via wireless communication. When the information-processing apparatus 26 receives a user's ID number, that user's name, address, and total amount of purchases up to that time, for example, are specified, and can be displayed on the display screen 40.

Figure 9:
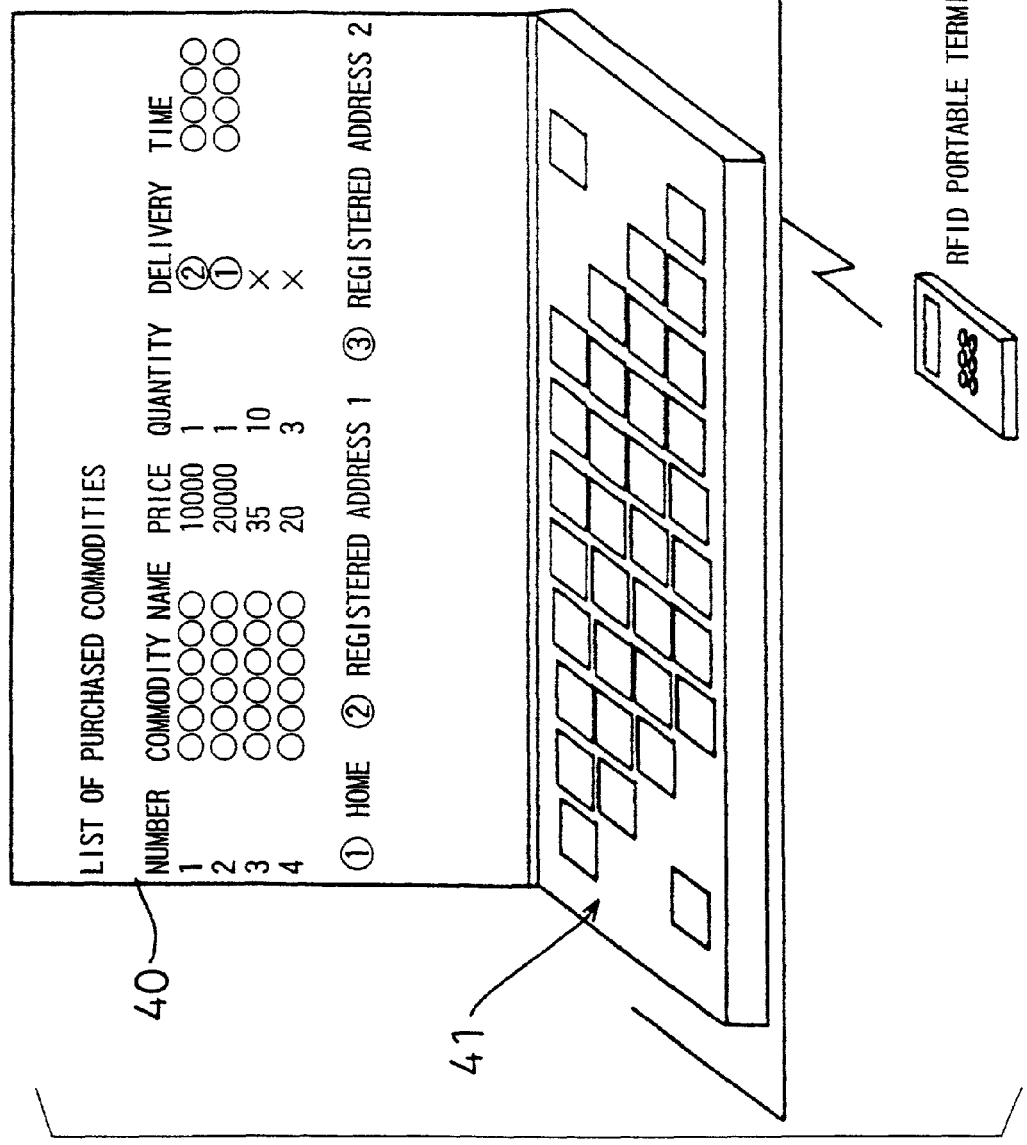
FIG. 9 is a diagram showing how, in the embodiment of FIG. 1, the shopping list of commodities is displayed and the verification of purchases and the addition of delivery information is performed on the display screen 40 of the information-processing apparatus 26 connected to the RFID portable terminal 22 via wireless communication.

FIG. 9 shows how the display screen 40 of the information-processing apparatus 26, or a terminal thereof, which is connected to the RFID portable terminal 22 by wireless communication, is used to verify purchases and add delivery information. A shopping list of commodities is displayed on the display screen 40. With respect to the displayed list, the customer 21 can add necessary additional information to each commodity, such as change the quantity purchased, designate the wrapping, designate whether the commodity should be delivered or will be taken home, and if delivery is designated, designate previously registered delivery addresses. The addition of supplementary information can be performed not only directly on the keyboard 41 but also by operating the select buttons 32 on the RFID portable terminal 22.

Figure 10:
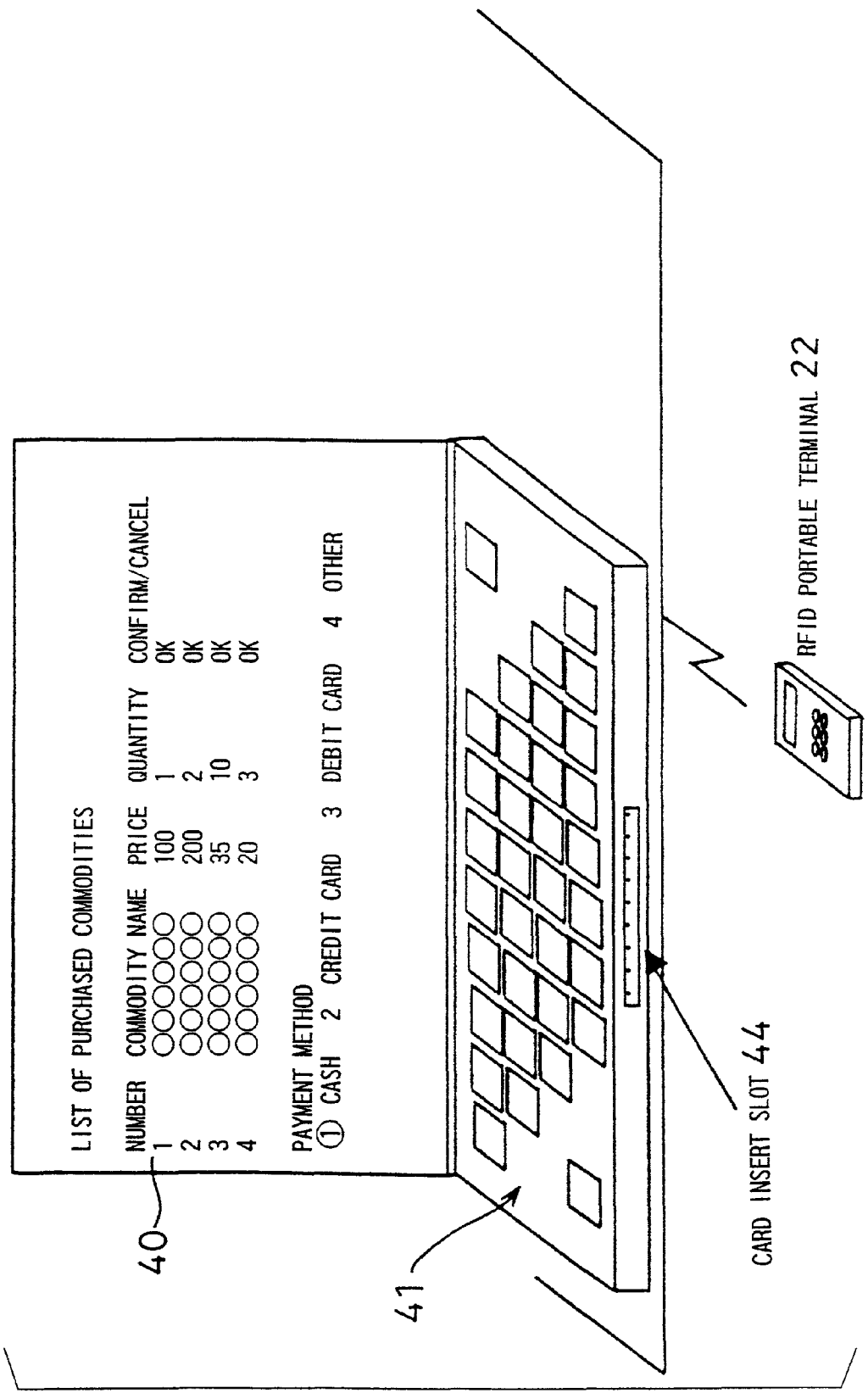
FIG. 10 is a diagram showing how, in the embodiment of FIG. 1, the shopping list of commodities is displayed and the method of payment for purchased items is selected on the display screen 40 of the information-processing apparatus 26 connected to the RFID portable terminal 22 via wireless communication.

FIG. 10 shows how the display screen 40 of the information-processing apparatus 26 or a terminal thereof, which is connected to the RFID portable terminal 22 via wireless communication, is used to display of a list of ordered commodities and designate a method of payment for the ordered commodities. For the method of payment it is possible to designate cash, credit card, or debit card, for example. When a credit card or debit card is designated, the card is inserted into a card insert slot 44, and the payment for sales can be carried out. If such payment by card is executed, it becomes possible to speed up the settlement of payment that accompanies the sale of commodities.

Figure 11:
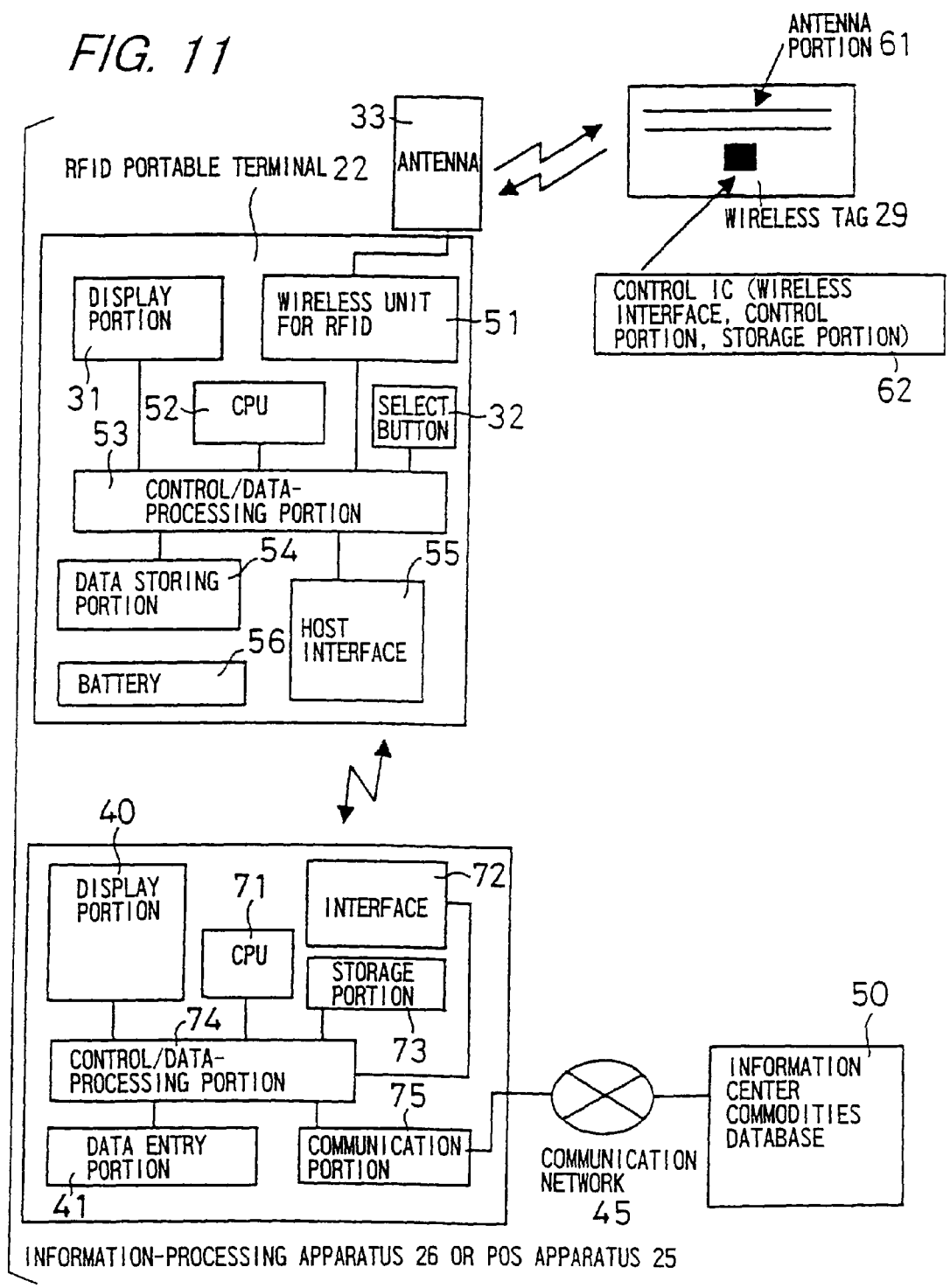
FIG. 11 is a block diagram illustrating the electrical configuration of the merchandise retail management system of the embodiment in FIG. 1.

FIG. 11 diagrammatically shows the electrical configuration of the present embodiment. The entire system for the merchandise retail management system includes a plurality of RFID portable terminals 22, a plurality of wireless tags 29, and one or more information-processing apparatuses 26 and POS apparatus 25. The information-processing apparatus 26 or POS apparatus 25 can be connected to an information center commodity database 50 via a transmission network 45. The information center commodity database 50 is provided in the event that a plurality of stores are centralized and managed. When merchandise management and sales management are carried out at each store, a database can be built within the information-processing apparatus 26 or the POS apparatus 25.

The RFID portable terminal 22 includes, along with the display apparatus 31, the select buttons 32 and the antenna 33 mentioned above, a RFID wireless unit 51, a CPU 52, a control/data-processing portion 53, a data-storing portion 54, a host interface 55, and a battery 56. The host interface 55 performs wireless communication with the information-processing apparatus 26 or the POS apparatus 25 as the wireless communication means, and can transmit data. Commodity information read from the wireless tag 29 of a commodity selected by the customer 21 is stored in the data-storing portion 54. The battery 56 supplies the RFID portable terminal 22 with necessary power. One part of this power is conveyed to the wireless tag 29 as electromagnetic waves from the antenna 33.

Figure 17:
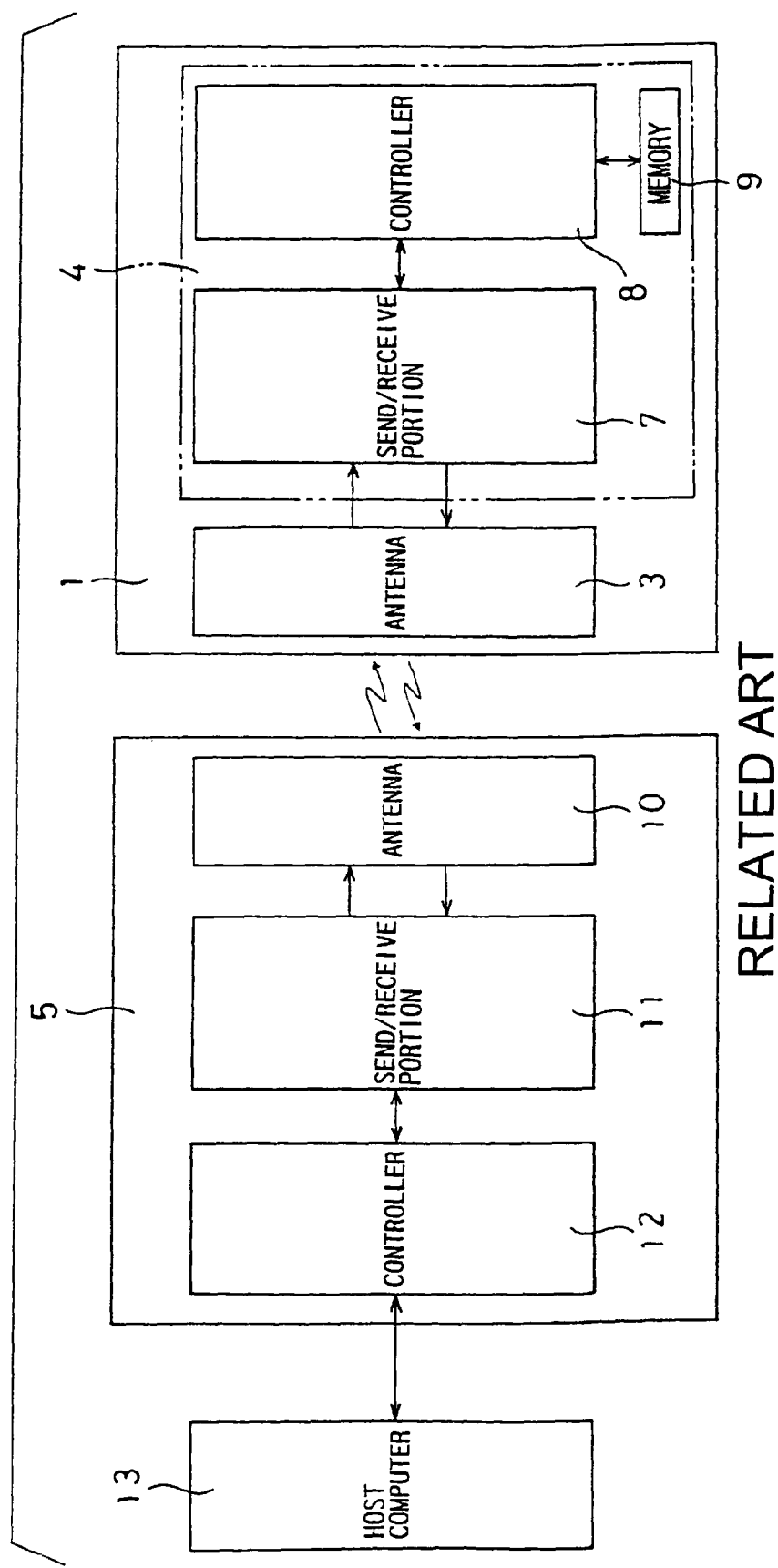
FIG. 17 is a block diagram illustrating the electrical configuration of the wireless tag and reader of FIG. 16.

The wireless tag 29 includes an antenna portion 61 and a control IC chip 62. The antenna 61 is a dipole antenna, for example, and is formed by a conductive pattern printed on an electrically insulating card. The control IC chip 62, like the IC chip 4 of FIG. 17, includes a wireless interface, a control portion, and a storage portion. The wireless tag 29 does not include a power source, and electrical power induced in the antenna portion 61 with electromagnetic waves received from the outside can be used to operate it.

The information-processing apparatus 26 or the POS apparatus 25 include a display portion as the display screen 40, a data entry portion such as the keyboard 41, a CPU 71, an interface 72, a storage portion 73, and control/data-processing portion 74, and a transmission portion 75. The interface 72 can be connected with the host interface 55 of the RFID portable terminal 22 via wireless communication.

In the present embodiment, because the interface 72 of the information-processing apparatus 26 or the POS apparatus 25 is connected to a portable terminal via wireless communication, only commodity codes are displayed on the sample commodity 23 with barcodes, for example, and the portable terminal can also be configured so as to read barcodes. Commodity information can be conveyed to the portable terminal from the information-processing apparatus 26, for example. However, if the wireless tags 29 are used, commodity information can be read out without increasing the volume transmitted between the wireless tags 29 and the information-processing apparatus 26, for example, and it becomes possible, for example, to emit high-output radio waves and detect when the sample commodity 23 is taken from the store sales area 20b.

Figure 12:
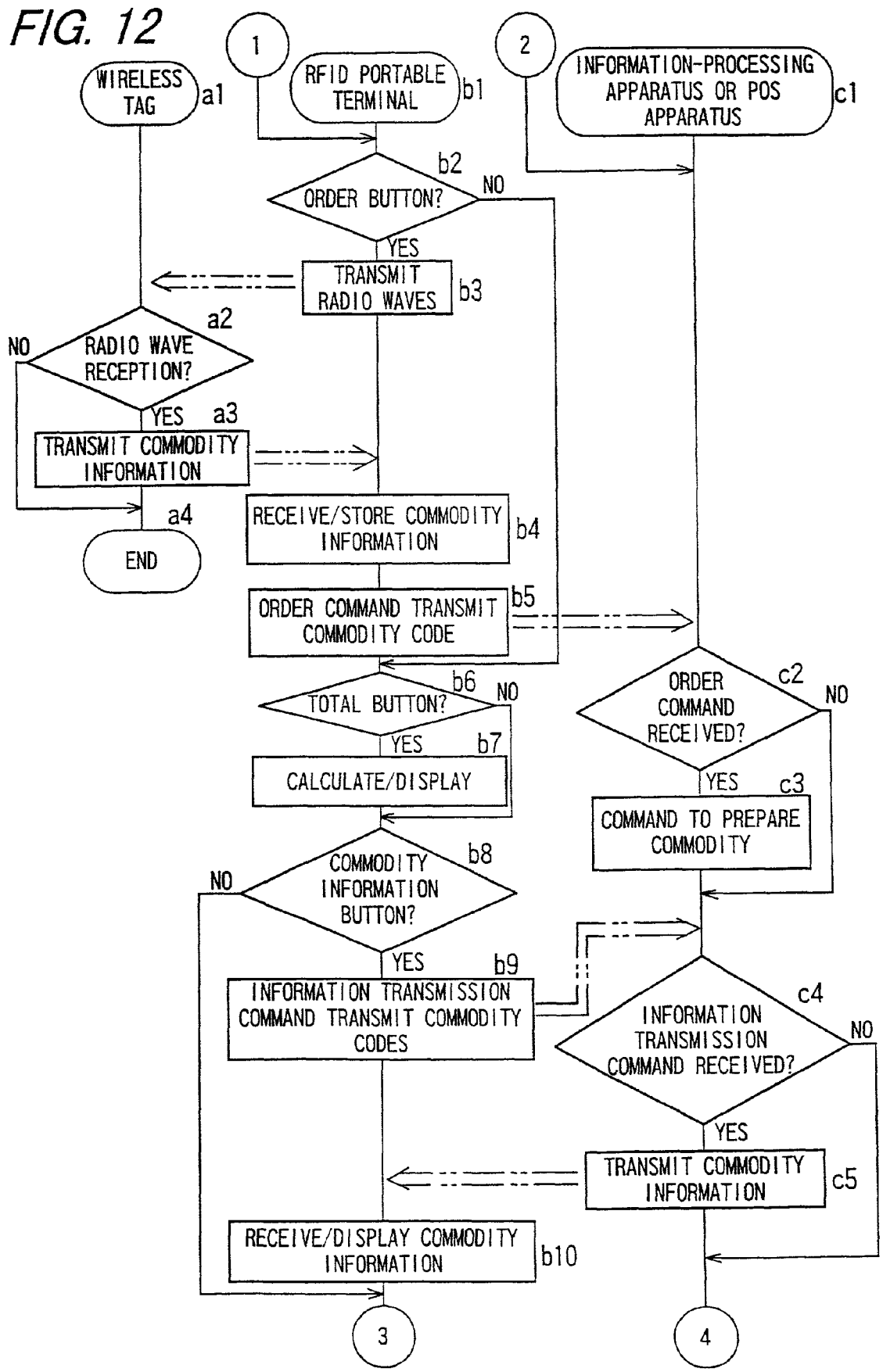
FIG. 12 is a flowchart showing the processing procedures of the wireless tag 29, the RFID portable terminal 22, and the information-processing apparatus 26 or the POS apparatus 25 according to the embodiment of FIG. 1.
Figure 13:
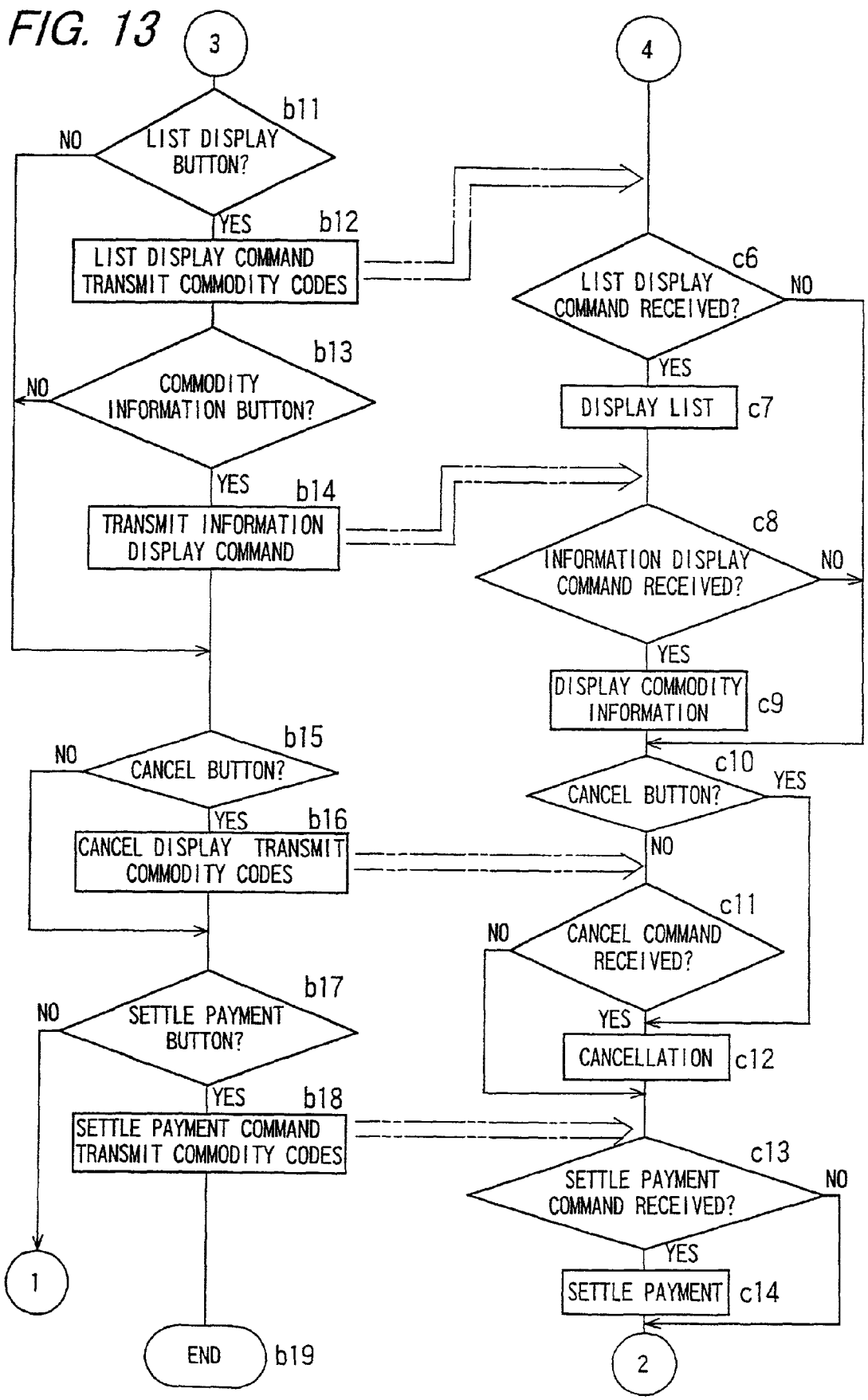
FIG. 13 is a flowchart showing the processing procedures of the wireless tag 29, the RFID portable terminal 22, and the information-processing apparatus 26 or the POS apparatus 25 according to the embodiment of FIG. 1.

FIG. 12 and FIG. 13 show the procedure of interaction between the wireless tag 29, the RFID portable terminal 22 and the information-processing apparatus 26 or the POS apparatus 25 in the present embodiment. In theory, the wireless tag 29 starts the procedure from step a1 of FIG. 12, and at step a2 determines whether radio waves are being received. If certain radio waves are received, commodity information is transmitted at step a3. After commodity information has been transmitted at step a3, or after it has been determined at step a2 that radio waves have not been received, the procedure finishes at step a4. In actuality, the wireless tag 29 receives radio waves and is activated, and if the radio waves fulfill certain conditions, the wireless tag 29 executes an operation to transmit commodity information at step a3.

The RFID portable terminal 22 starts the procedure from step b1. Whether the order button 32A has been pushed is determined at step b2. If the order button 32A has been pressed, radio waves are transmitted to the wireless tag 29 at step b3, and the commodity information transmitted from the wireless tag 29 at step a3 is received and stored at step b4. Next, at step b5, the instruction to order a commodity and the commodity code is transmitted to the information-processing apparatus 26 or the POS apparatus 25.

After step b5 is finished, or if at step b2 is it determined that the order button 32A has not been pressed, step b6 determines whether the total button 32B has been pushed. If it is determined that the total button 32B has been pushed, step b7 executes the calculation and display of the total, such as that shown in FIG. 5A. After step b7 is finished, or if it is determined at step b6 that the total button 32B has not been pushed, step b8 determines whether the commodity information button 32C has been pushed. If it is determined that the commodity information button 32C has been pushed, the order to transmit information and the commodity code is transmitted to the information-processing apparatus 26 or the POS apparatus 25 at step b9. The commodity code that is transmitted can be the (ordered) commodity code stored in the RFID portable terminal 22, or a commodity code newly obtained from the wireless tag 29 of the wireless tag label 24 attached to the sample commodity 23 that the RFID portable terminal 22 is directed towards when the commodity information button 32C is pushed down. The following steps are similar with regard to the commodity code. At step b10, commodity information is received from the information-processing apparatus 26 or the POS apparatus 25, and is displayed as shown in FIG. 5B.

The information-processing apparatus 26 or the POS apparatus 25 begin the procedure from step c1, and at step c2 determine whether an order command sent from the RFID portable terminal 22 at step b5 was received. If it is determined that a purchase order was received, at step c3 the information-processing apparatus 26 or the POS apparatus 25 order the preparation of the commodity according to the simultaneously transmitted commodity code. After step c3 is finished, or if it is determined at step c2 that the order commodity command was not received, the procedure advances to step c4, and it is determined whether the transmit information command sent by the RFID portable terminal 22 at step b9 was received. If it is determined that a transmit information command was received, at step c4 commodity information is transmitted to the RFID portable terminal 22.

After step b10 is finished, or if it is determined that the commodity information button 32C was not pressed at step b8, the RFID portable terminal 22 advances to step b11 of FIG. 13. Step b11 determines whether the list display button 32E was pressed. If it is determined that the button has been pressed, the RFID portable terminal 22, at step b12, transmits commodity codes and instructions to display the list to the information-processing apparatus 26 or the POS apparatus 25. After step b12 is finished, the RFID portable terminal 22 at step b13 determines whether the commodity information button 32C has been pushed. If it is determined that the button has been pushed, the information display instructions are transmitted to the information-processing apparatus 26 or POS apparatus 25 at step b14.

The procedure advances to step b15 after step b14 is finished, or if it is determined at step b11 that the list display button 32E was not pushed, or if it is determined at step b13 that the commodity information button 32C was not pushed. Step b15 determines whether the cancel button 32D was pushed. If it is determined that the button was pushed, at step b16 the cancel instructions and a commodity code are transmitted to the information-processing apparatus 26 or the POS apparatus 25.

After step b16 is finished, or if it is determined at step b15 that the cancel button 32D was not pushed, step b17 determines whether the settle payment button 32F was pushed. If it is determined that the settle payment button 32F was pushed, at step b18 the instruction to settle payment and the commodity codes are transmitted to the information-processing apparatus 26 or the POS apparatus 25, and the procedure finishes at step b19. If it is determined at step b17 that the settle payment button 32F was not pushed, the procedure returns to step b2 in FIG. 12.

The information-processing apparatus 26 or the POS apparatus 25 proceed to step c6 in FIG. 13 after step c5 in FIG. 12 is finished, or If it is determined at step c4 that no information transmit command was received. Step c6 determines whether the list display command transmitted from the RFID portable terminal 22 at step b12 has been received. If it is determined that that command has been received, at step c7 a shopping list of commodities is displayed according to the simultaneously transmitted commodity codes, such as the one shown in FIG. 6. Next, step c8 determines whether the information display command transmitted from the RFID portable terminal 22 at step b14 has been received. If it is determined that the command has been received, at step c9 commodity information as shown in FIG. 7 is displayed according to the simultaneously transmitted commodity codes. The procedure advances to step c10 after step c9 is finished, or if it is determined at step c6 that the list display command was not received, or if it is determined at step c8 that no information display command was received.

Step c10 determines whether the cancel button 42 has been pressed, as shown in FIG. 6. If it is determined that it has not been pressed, step c11 determines whether a cancel command transmitted by the RFID portable terminal 22 at step b16 was received. If it is determined that a cancel command was received, or if it is determined at step c10 that the cancel button 42 has been pressed, cancellation is performed at step c12.

The procedure advances to step c13 after step c12 is finished, or if it is determined at step c11 that no cancellation instructions have been received, and step c13 determines whether the settle payment command transmitted by the RFID portable terminal 22 at step b18 was received. If it is determined that the command was received, the settlement of payment is performed at step c14. After step c14 is finished, or if it is determined at step c13 that no settle payment command has been received, the procedure returns step c2 in FIG. 12.

FIG. 14A through FIG. 14C diagrammatically show a merchandise retail management method and a merchandise retail management system according to another embodiment of the invention. In this embodiment, components corresponding to the embodiment of FIG. 1A through FIG. 1C have been given identical reference numerals, and duplicate explanations have been omitted. In a merchandise retail store 80 of the present embodiment, an RFID portable terminal 82 is lent out to the customer 21 at a store entrance 80a. The RFID portable terminal 82 is only provided with the function of storing commodity information, and is not provided with the function of relaying that commodity information to the outside, as is the RFID portable terminal 22 of the embodiment of FIG. 1A through FIG. 1C. The customer 21 should operate the RFID portable terminal 82 in the same way as the RFID portable terminal 22 of FIG. 1.

As shown in FIG. 14A, the RFID portable terminal 82 lent out to the customer 21 is used to make purchases in a store sales area 80b, as shown in FIG. 14B. The commodity code of a desired commodity is stored in the RFID portable terminal 82, and as shown in FIG. 14C, the customer 21 proceeds to a sales counter 80c, and if the RFID portable terminal 82 is handed over, a POS apparatus, for example, can read out the commodity codes stored in the RFID portable terminal 82, settle payment therefor, and prepare the commodity. In the present embodiment, although the preparation of commodity is begun later than in the embodiment of FIG. 1A through FIG. 1C, the structure of the RFID portable terminal 82 and the store sales area 80b, for example, can be simplified.

Figure 15:
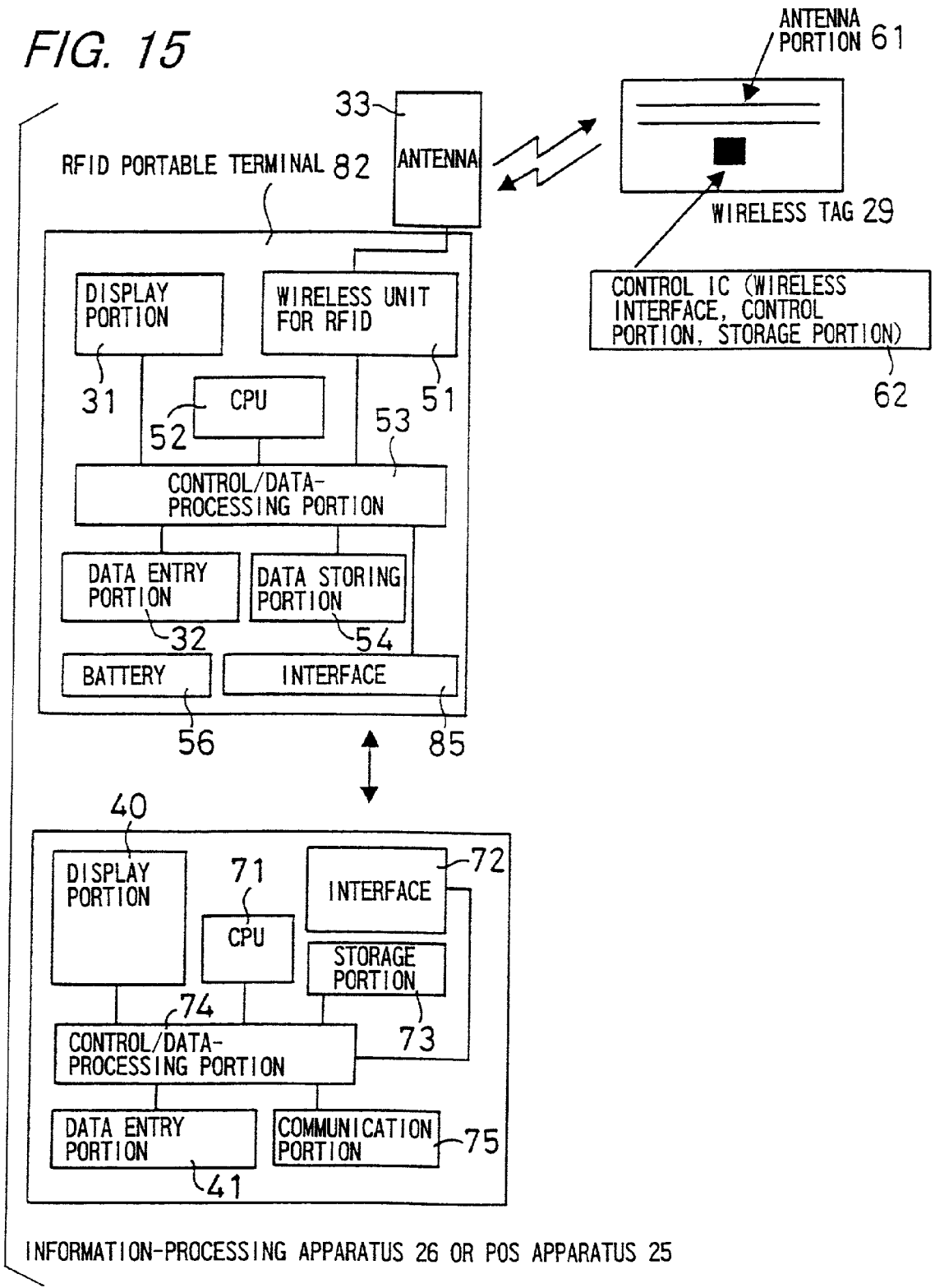
FIG. 15 is a block diagram illustrating the electrical configuration of the merchandise retail management system of the embodiment of FIG. 14.

FIG. 15 diagrammatically shows the electrical structure of the merchandise retail management system of the present embodiment. Although the RFID portable terminal 82 has an interface 85 and is thus provided with the ability to connect with an interface 72 of the information-processing apparatus 26 or the POS apparatus 25 at the sales counter 80c, it is not provided with the function of performing a relay of commodity information when it reads out that commodity information from the wireless tag 29. The select buttons 32 are equivalent to the data entry portion.

In the present embodiment, although the RFID portable terminal 82 does not relay commodity information at the same time that it reads out that information, if a terminal, for example, of the information-processing apparatus 26 or the POS apparatus 25 is disposed at a key location in the store sales area 80b, and if that terminal is capable of reading out information stored in the RFID portable terminal 82 while the customer 21 selected the commodity, it would be possible to begin the preparation of an ordered commodity in advance.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A merchandise retail management method comprising the steps of:
    putting a tag on display together with a sample commodity in a display area, commodity information including an identification code of the commodity, being allowed to be read from and written to the tag;
    lending out a portable terminal capable of reading the tag to a customer entering the display area;
    reading the commodity information from the tag, which is put on display together with the corresponding sample commodity, with the portable terminal when the customer indicates an interest in purchasing the commodity;
    storing the corresponding commodity information in the portable terminal and relaying it to an information-processing apparatus for merchandise management and sales management;
    comparing at the information-processing apparatus the commodity information which has already been relayed to the information-processing apparatus, with commodity information which is sent from the portable terminal to a POS apparatus at a sales counter and is then entered into the information-processing apparatus;
    the customer returning the portable terminal when leaving; and
    handing over the commodity to the customer after the commodity to be sold has been prepared in accordance with the comparison result of commodity information at the information-processing apparatus.

2. The merchandise retail management method of claim 1, wherein a wireless tag is used which commodity information is allowed to be read from and written to via radio waves, and the commodity information is relayed to the information-processing apparatus at the same time when the commodity information is read from the wireless tag.

3. A merchandise retail management system for aggregating commodity information of commodities that a customer indicates an intent to purchase from among sample commodities which are on display in a display room, and for preparing the commodities, comprising:
    a wireless tag displayed on each sample commodity, wherein commodity information, including an identification code of that commodity can be read from and written to the wireless tag via radio waves;
    a portable terminal that is held by customers that have entered the display room, and which is capable of reading the commodity information on the wireless tag, that stores commodity information that has been read out and relays the commodity information to the outside;
    a POS apparatus adapted to receive the commodity information sent from the portable terminal at a sales counter; and
    an information-processing apparatus for receiving the relay from the portable terminal, indicating what commodity to have prepared in accordance with what the customer has indicated the intent to purchase and comparing the commodity information which has already been relayed to the information-processing apparatus, with commodity information which is sent from the portable terminal to the POS apparatus and is then entered into the information-processing apparatus.

4. The merchandise retail management system of claim 3, further comprising a rewriting apparatus for rewriting the commodity information on the wireless tag.

5. The merchandise retail management system of claim 3, wherein the portable terminal includes:
    input means with which the customer commands an arithmetic process relating to stored commodity information; and
    arithmetic means for conducting arithmetic processing according to the command to the input means.

6. The merchandise retail management system of claim 4, wherein the portable terminal includes:
    input means with which the customer commands an arithmetic process relating to stored commodity information; and
    arithmetic means for conducting arithmetic processing according to the command to the input means.

7. The merchandise retail management system of claim 3, wherein the portable terminal includes:
    input means with which the customer designates stored commodity information; and
    display means for displaying commodity information in accordance with the designation made to the input means.

8. The merchandise retail management system of claim 3, wherein the portable terminal relays commodity information to at least one of a POS apparatus and an information processing apparatus at the same time that the portable terminal reads out the commodity information from the wireless tag.

9. The merchandise retail management system of claim 3, wherein the information-processing apparatus includes:
    wireless communication means for wireless communication with the portable terminal held by a customer checking out; and
    customer specification means for specifying customers by wireless communication via the wireless communication means.

10. The merchandise retail management system of claim 9, wherein the information-processing apparatus further includes:
    commodity information readout means for reading out the commodity information stored in the portable terminal through wireless communication with the portable terminal via the wireless communication means;
    display means for displaying a list of commodity information that has been read out by the commodity information readout means;
    correction input means for receiving corrected input from customers who have viewed the list displayed by the display means; and
    commodity correction means for correcting commodity information in accordance with the corrected input when the corrected input means receives corrected input.

11. The merchandise retail management system of claim 10, wherein the information-processing apparatus carries out revision and addition of information to the list through wireless communication with the portable terminal via the wireless communication means.

12. The merchandise retail management system of claim 10, wherein the information-processing apparatus is further provided with payment processing means capable of processing payment for sales, displayed by the display means.

13. The merchandise retail management system of claim 11, wherein the information-processing apparatus is further provided with payment processing means capable of processing payment for sales, displayed by the display means.

14. A portable terminal comprising:
- a tag reader for reading via radio waves commodity information written onto a wireless tag located on a sample commodity remote from a checkout area and customer identifying information written onto another wireless tag;
- a storage for accumulating and storing commodity information that has been read by the tag reader;
- a wireless communication device for transmitting commodity information to an information-processing apparatus via radio waves at the same time that the commodity information is stored in the storage, and transmitting the customer identifying information to the information-processing apparatus via radio waves; and
- a display for displaying the commodity information that has been read out.

15. The merchandise retail management method of claim 1, wherein the portable terminal reads via radio waves customer identifying information written onto another wireless tag, and transmits the customer identifying information to the information-processing apparatus via radio waves.

16. The merchandise retail management system of claim 3, wherein the portable terminal reads via radio waves customer identifying information written onto another wireless tag, and transmits the customer identifying information to the information-processing apparatus via radio waves.

* * * * *